(12) United States Patent
Yamada et al.

(10) Patent No.: US 6,864,032 B2
(45) Date of Patent: Mar. 8, 2005

(54) METHOD FOR FORMING AZO COLORANT USING DIAZO COMPOUND AND COUPLER HAVING LEAVING GROUP AND RECORDING MATERIAL USING THE COUPLER

(75) Inventors: Hisao Yamada, Shizuoka-ken (JP); Mitsuyuki Tsurumi, Shizuoka-ken (JP); Kazunori Nigorikawa, Shizuoka-ken (JP)

(73) Assignee: Fuji Photo Film Co., Ltd., Kanagawa (JP)

( * ) Notice: Subject to any disclaimer, the term of this patent is extended or adjusted under 35 U.S.C. 154(b) by 295 days.

(21) Appl. No.: 09/836,236

(22) Filed: Apr. 18, 2001

(65) Prior Publication Data

US 2002/0016260 A1 Feb. 7, 2002

(30) Foreign Application Priority Data

Apr. 18, 2000 (JP) ........................................ 2000-116580

(51) Int. Cl.$^7$ ................................................ G03F 7/021
(52) U.S. Cl. ........................ 430/138; 430/157; 430/163; 430/179; 430/181; 430/182; 430/189

(58) Field of Search .................................. 430/138, 157, 430/163, 179, 181, 182, 189, 180

(56) References Cited

U.S. PATENT DOCUMENTS

| | | | | | |
|---|---|---|---|---|---|
| 5,866,293 | A | * | 2/1999 | Nomura et al. | 430/138 |
| 5,925,489 | A | * | 7/1999 | Kawabuchi et al. | 430/138 |
| 6,228,553 | B1 | * | 5/2001 | Matsushita et al. | 430/179 |
| 6,346,359 | B1 | * | 2/2002 | Yamada et al. | 430/138 |

OTHER PUBLICATIONS

Helvetica Chimica Acta, vol. 55, Fasc. 6 (1972), Nr. 206, pp. 2139–2145.
J.C.S. Perkin II (1982), pp. 455–459.
Science & Industry, vol. 60(8), pp. 307–314 (1986).

* cited by examiner

*Primary Examiner*—John S. Chu
(74) *Attorney, Agent, or Firm*—Sughrue Mion, PLLC

(57) ABSTRACT

The present invention provides a method for forming an azo colorant by reaction of a diazo compound and a coupler. The coupler has a leaving group at the coupling position thereof, such that a coupling reaction rate is faster than it would be if the coupler did not have the leaving group. The coupling reaction rate constant k is preferably 0.1 ($s^{-1}$) or more.

32 Claims, No Drawings

METHOD FOR FORMING AZO COLORANT USING DIAZO COMPOUND AND COUPLER HAVING LEAVING GROUP AND RECORDING MATERIAL USING THE COUPLER

BACKGROUND OF THE INVENTION

1. Field of the Invention

The present invention relates to a method for forming an azo colorant and a recording material that utilizes the same, and more specifically to a method for forming an azo colorant and a recording material which are capable of realizing a quick reaction rate and quick color development.

2. Description of the Related Art

A large number of reports have been presented concerning an azo colorant forming reaction using a coupler and a diazo compound. Representative literature includes "Color Chemistry" (written by Heinrich Zollinger, Weinheim New York Bose L Cambridge, 1987), "Synthetic Dye" (written by Hiroshi Horiguchi, Sankyo Shuppan Corp., 1970), and the like. Detailed explanations are given in sections concerning azo dyes and azo pigments.

Several methods for forming an azo colorant are known. An azo coupling reaction is commonly used. Azo coupling is a reaction which forms an azo colorant from a diazo compound and a coupling component (hereinafter referred to as a "coupler"). Below formulae of representative azo coupling reactions are shown.

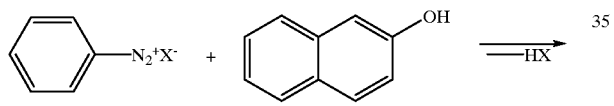

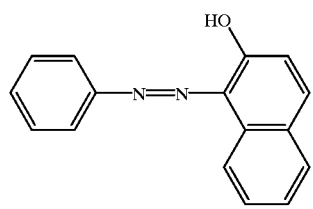

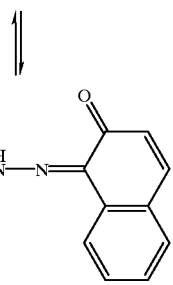

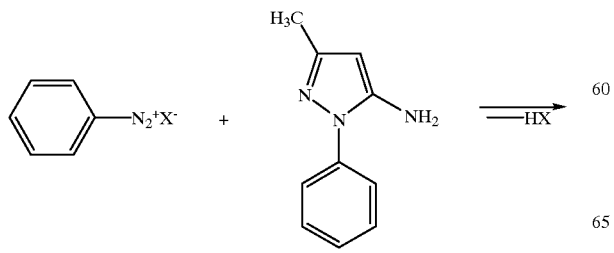

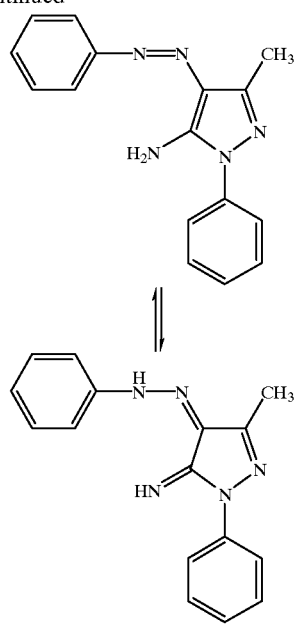

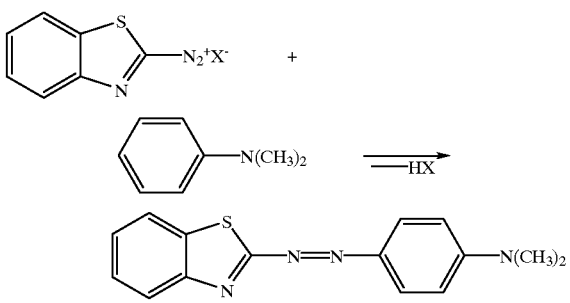

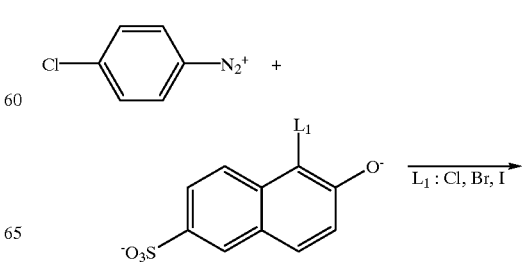

From the above examples it can be seen that in an azo coupling reaction, a counter anion (X⁻) leaves the diazo compound, and a hydrogen atom leaves the coupler, and an azo bond is formed.

Accordingly, most couplers have a hydrogen atom at a position at which the azo bond is generated, and there are only a few examples having a substituent thereat.

For example, in Helvetica Chimica Acta 55. 2139 (1972), a coupling reaction between a naphthol based coupler having a leaving group (halogen) at a coupling position and a p-chlorobenzene diazonium salt is reported. However, a coupling rate of a coupling reaction using a coupler having this leaving group is much lower than that of a coupling reaction using an unsubstituted coupler.

-continued

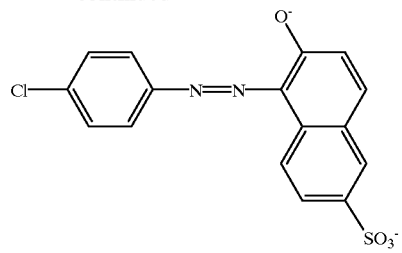

Besides this report, it is generally understood that introduction of a substituent at the coupling position of a coupler result in a slow reaction rate in the azo coupling reaction. A diazo compound to be used is selected such that a combination of the coupler having a leaving group and the diazo compound has a high reactivity, for example, a diazo compound with an electron-attractive group, or a diazo compound in which a diazo group is bonded to a χ-electron-deficient heteroring skeleton is preferably used.

Also, in relation to photography using silver halides, couplers having leaving groups have been discussed widely, and a large number of reports have been provided (for example, Corona Corp., Revised Edition, "Basics of Photographic Engineering—Silver Salt Photography—", and the like). However, the leaving groups in these reports were defined to be groups that can be released by reaction with an oxidized color developing agent such as quinonediimine. No examples of a compound having a group that can be released by reaction with a diazonium salt have been disclosed.

In a color-developing reaction that uses a coupler and a diazo compound, one important requirement is that a color-developing reaction rate (coupling rate) is high and there is little side reaction. In practical terms, when considering application to azo colorant synthesis, a recording material and the like, it is necessary to provide a certain greatness of reaction rate (speed) for the azo coupling. In general, in cases where the same diazo compound is used, the coupling rate is determined substantially by the coupler skeleton. It is possible to improve the coupling rate by appropriately changing substituents at positions other than the coupling position of the coupler. However, the coupler stability deteriorates, which causes various problems.

A diazo compound as described above forms an azo dye by reaction with a coupler such as a phenol derivative, and has photosensitivity so as to be decomposed by light irradiation and lose activity. Therefore, diazonium salt compounds have been used as light recording materials including diazo copys for a long time, as disclosed in the above-mentioned literature ("Basics of Photographic Engineering—Silver Salt Photography—", edited by Japan Photography Association, Corona Corp. (1982), see pages 89 to 117 and 182 to 201).

By utilizing the characteristics of the diazo compound, which is decomposed by light and loses activity, the same has recently been applied to recording materials, requiring fixation of an image. As a representative example, a light-fixing type heat-sensitive recording material in which a diazonium salt compound and a coupler compound are heated according to an image signal for reaction so as to form an image, and then irradiated with light for fixing the image, has been proposed (Koji Sato et al., Imaging Electronics Association Journal, Vol. 11, No. 4 (1982), pages 290 to 296, and the like).

Even in the case of application in such a recording material, the same problem as in the above-mentioned azo colorant forming reaction occurs. That is, if the coupler activity is raised for improvement of the color development property of the recording material, the coupler stability is lowered, so that problems such as an increase of fogging in a base portion, generation of light-exposure coloring, and deterioration of image storability with respect to light and heat arise. Thus, coupler activity has an inverse relationship with coupler stability. Therefore, an effective method for dramatically improving the coupling activity without greatly deteriorating the coupler stability has not been found yet. In contrast, in cases of adopting a method for improving diazo compound activity, formation of capsules becomes difficult and fogging tends to be increased. Accordingly, it has been desired to obtain a recording material having excellent color-developing property and stability without impairing the stability of each compound related to color development.

SUMMARY OF THE INVENTION

An object of the present invention is to provide a method for forming an azo colorant with a high coupling activity, a high reaction rate, and an excellent color-developing property, and a recording material applying the same and having an excellent color-developing property and good stability with respect to heat and light.

The present inventors have found that the above-mentioned problems can be solved by a method for forming an azo colorant using a coupler that has a leaving group as follows, and have completed the present invention.

That is, the present invention provides a method for forming an azo colorant, wherein a coupler having a leaving group at a coupling position thereof and a diazo compound are used, and the method has a faster coupling reaction rate than an azo dye-forming reaction between the diazo compound and the coupler having a hydrogen atom at the coupling position. The present invention is novel compared with an azo colorant forming reaction that uses a conventional coupler having a leaving group, in that the present invention uses a benzene diazonium salt substituted with an electron-donative group as a diazo compound, and combines the same with a reducing agent or base or the like. The present invention achieves a significant improvement in coupling speed and quick azo colorant formation, which could not be foreseen from the conventional art.

Moreover, the present invention is a method for forming an azo colorant, wherein a coupler having a leaving group at a coupling position thereof and a diazo compound are used, and the method has a coupling reaction rate constant k of at least $0.1 \text{ s}^{-1}$.

Examples of preferable couplers used in such a method for forming an azo colorant include couplers having structures represented by the following general formulae (1), (2), (3), (4), and (5).

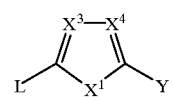

(1)

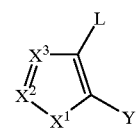

(2)

-continued

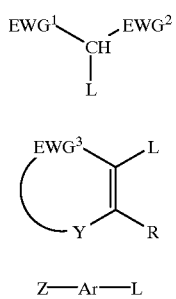

(3)

(4)

(5)

In the above general formulae (1), (2), (3), (4) and (5), $X^1$, $X^2$, $X^3$, and $X^4$ each independently represents an atomic group necessary for forming a five-membered aromatic heteroring. Y represents a hydroxyl group, an amino group which may have a substituent, an alkyl group which may have a substituent, an aryl group which may have a substituent, an alkoxy group which may have a substituent, or an aryloxy group which may have a substituent. R represents a hydroxyl group, an alkyl group which may have a substituent, an aryl group which may have a substituent, an alkoxy group which may have a substituent, an aryloxy group which may have a substituent, an amino group which may have a substituent, an alkylthio group which may have a substituent, or an arylthio group which may have a substituent. Z represents a hydroxyl group or an amino group which may have a substituent. Ar represents a benzene ring, a naphthalene ring, a pyridine ring, or a quinoline ring, each of which may have a substituent. L represents a substituent that is releasable at a time of coupling with a diazo compound. $EWG^1$, $EWG^2$ and $EWG^3$ each independently represents an electron attractive group. Each of pairs, $X^1$ and Y, $EWG^1$ and $EWG^2$, and Y and R may link with each other so as to form a ring.

In cases of the above-mentioned general formulae (1), (2), (3), (4), and (5) where the structure can have a tautomer, the tautomer is included in the general formulae.

Moreover, examples of a diazo compound as the other component in the reaction preferably include compounds having structures represented by the following general formulae (6), (7), and (8).

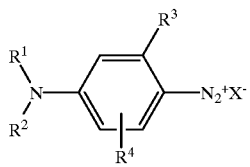

(6)

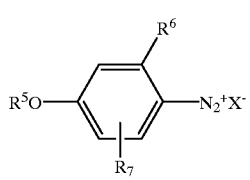

(7)

-continued

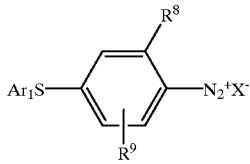

(8)

In the general formulae (6) and (7), $R^1$ and $R^2$ represent a hydrogen atom or an alkyl group which may have a substituent. $R^1$ and $R^2$ may link with each other so as to form a heterocycle, but $R^1$ and $R^2$ cannot both be a hydrogen atom. $R^3$ represents an alkyl group which may have a substituent, an alkoxy group which may have a substituent, an aryloxy group which may have a substituent, an alkylthio group which may have a substituent, an arylthio group which may have a substituent, an alkylsulfonyl group which may have a substituent, or an arylsulfonyl group which may have a substituent. $R^4$ represents a hydrogen atom, an alkyl group which may have a substituent, or an alkoxy group which may have a substituent. $R^5$ represents a hydrogen atom or an alkyl group which may have a substituent. $R^6$ and $R^7$ represent an alkyl group which may have a substituent, an alkoxy group which may have a substituent, an aryloxy group which may have a substituent, an alkylthio group which may have a substituent, or an arylthio group which may have a substituent. $R^6$ and $R^7$ may be the same as each other or different. $X^-$ represents an acid anion.

In the method for forming an azo colorant of the present invention, further improvement of the reaction rate can be realized by using a reducing agent and/or a base as a reaction accelerator.

In the method for forming an azo colorant of the present invention, it is preferable that L in the general formulae (1), (2), (3), (4) and (5) is a halogen atom, an alkylthio group which may have a substituent, an arylthio group which may have a substituent, an alkyl group which may have a substituent, an alkoxy group which may have a substituent, an aryloxy group which may have a substituent, an arylsulfonyloxy group which may have a substituent, an acyloxy group which may have a substituent, a benzoyloxy group which may have a substituent, a dialkylaminocarbonyloxy group which may have a substituent, a diarylaminocarbonyloxy group which may have a substituent, an alkoxycarbonyloxy group which may have a substituent, an aryloxycarbonyloxy group which may have a substituent, an N-pyrazolyl group which may have a substituent, an N-imidazolyl group which may have a substituent, or an N-benzotriazolyl group which may have a substituent.

By utilizing the method for forming an azo colorant of the present invention, since excellent stability and a fast color-developing rate are provided, the color-developing reaction between the diazo compound and the coupler can proceed efficiently, the color-developing density of the diazo compound being used can be sufficiently realized, and thus excellent color-developing density can be obtained. If the color-developing rate was low, a risk of deactivation of the diazo compound during the process of the reaction would increase with the passage of time. Thus, sufficient color-developing density would be difficult to achieve.

Moreover, a recording material of the present invention has on a support at least one recording layer containing a diazo compound and a coupler that reacts with the diazo compound for developing color. The coupler has a leaving group at a coupling position thereof.

Furthermore, another recording material of the present invention has on a support at least one recording layer containing a diazo compound and a coupler that reacts with the diazo compound for developing color. The coupler has a leaving group at a coupling position thereof, a coupling reaction rate thereof is faster than for a case in which a coupler not having a leaving group at the coupling position is used, namely, a case in which a coupler having a hydrogen at the coupling position is used, and the coupling reaction rate constant k thereof is 0.1 ($s^{-1}$) or more.

The couplers used in these recording materials are preferably those having the structures represented by the above-mentioned general formulae (1), (2), (3), (4) and (5). Moreover, the diazo compounds to be used in combination therewith are preferably compounds represented by the above-mentioned general formulae (6), (7) and (8), from the viewpoint of the effectiveness. Furthermore, the diazo compounds are preferably contained in microcapsules from the viewpoint of stability.

In the present invention, the "coupling rate" is obtained by measurement of a pseudo first order reaction rate with a greatly excessive amount of the coupler. This is because measurement is constrained by the diazo compound in the reaction having absorbance in the UV long-wave region. The coupling rate is defined as a value as follows.

A solution containing the diazo compound at a mole concentration of $8\times10^{-5}$ and a solution containing the coupler and the base each at a mole concentration of $8\times10^{-3}$ are mixed in equivalent amounts using a stopped flow measurement device (produced by Otsuka Electronics Co. Ltd., RA-401). Change with time of generated colorant absorbance is measured. A coupling rate constant (k) is calculated from formula (1) as follows.

$$d[\text{colorant}]/dt = k'[\text{diazo compound}][\text{coupler dissociated product}] \quad \text{formula (1)}$$

In formula (1), t denotes time (s), [colorant] denotes a mole amount (mol) of the produced colorant, [diazo compound] denotes the initial diazo compound mole amount (mol), and [coupler dissociated product] denotes mole amount (mol) of a coupler dissociated product.

If there is a greatly excessive amount of the coupler and the base with respect to the diazo compound, [coupler dissociated product] in formula (1) can be regarded as a constant.

$$k = k'[\text{coupler dissociated product}] \quad \text{formula (2)}$$

In the present invention, the k in formula (2) is defined to be the coupling rate constant (/s).

The name of a solvent used for the reaction is shown after the k in parentheses. For example, in the case of ethyl acetate, the reaction rate constant is shown as k (ethyl acetate).

DETAILED DESCRIPTION OF THE PREFERRED EMBODIMENTS

Hereinafter, the present invention will be explained in detail.

First, the method for forming an azo colorant of the present invention will be described.

In an ordinary azo coupling reaction method, if a coupler to be coupled with a diazo compound has general formula (9), the group concerning the reaction is —H. If a case of using a method for forming an azo colorant of the present invention is applied thereto, a coupler having a leaving group is represented by general formula (10).

Here, Cp represents a mother core of the coupler, H a hydrogen atom, and L a substituent releasable at the time of coupling with a diazo compound (hereinafter referred to as a leaving group where appropriate).

One, two, or more of leaving group -L may be introduced to the coupler mother core as a substituent. Kinds of the leaving group include a halogen atom, an aromatic azo group, an alkyl group, an aryl group, a heterocyclic group, an alkyl or arylsulfonyl group, an arylsulfinyl group, an alkylcarbonyl group, an arylcarbonyl group or heterocyclinc carbonyl group, each of which bonds to the coupling position via an oxygen, nitrogen, sulfur or carbon atom, or a heterocyclic group that bonds with the coupling position by a nitrogen atom. Specific examples include a halogen atom, an alkoxy group, an aryloxy group, an acyloxy group, an alkylsulfonyloxy group, an arylsulfonyloxy group, an acylamino group, an alkylsulfonamide group, an arylsulfonamide group, an alkoxycarbonyloxy group, an aryloxycarbonyloxy group, an alkylthio group, an arylthio group, a heterocyclic thio group, a carbamoylamino group, an arylsulfinyl group, an arylsulfonyl group, a five-membered or six-membered nitrogen-containing heterocyclic group, an imide group, and an arylazo group. An alkyl group or heterocyclic group contained in these leaving groups may further be substituted by a substituent such as an alkoxy group, an aryloxy group, a halogen atom, an alkoxycarbonyl group, an alkylcarbonyloxy group, or the like.

In cases where two or more substituents are introduced, they may be the same as each other or different, and the substituents may further have the above-mentioned substituents.

Moreover, the L may form a ring with the coupler mother core.

Further specifically, the leaving group may be a halogen atom (fluorine, bromine, chlorine, iodine), an alkoxy group (for example, ethoxy, dodecyloxy, methoxyethylcarbamoylmethoxy, carboxypropyloxy, methylsulfonylethoxy, or ethoxycarbonylmethoxy), an aryloxy group (for example, 4-methylphenoxy, 4-chlorophenoxy, 4-methoxyphenoxy, 4-carboxyphenoxy, 3-ethoxycarboxyphenoxy, 3-acetylaminophenoxy, or 2-carboxyphenoxy), an acyloxy group (for example, acetoxy, tetradecanoyloxy, or benzoyloxy), an alkylsulfonyloxy group or arylsulfonyloxy group (for example, methanesulfonyloxy, or toluenesulfonyloxy), an acylamino group (for example, dichloracetylamino, or heptafluorobutylylamino), an alkylsulfonamide group or arylsulfonamide group (for example, methanesulfonamide, trifluoromethanesulfonamino, or p-toluenesulfonyl amino), an alkoxycarbonyloxy group (for example, ethoxycarbonyloxy, or benzyloxycarbonyloxy), an alkylthio group or arylthio group or heterocyclic thio group (for example, ethylthio, 2-carboxyethylthio, dodecylthio, 1-carboxy dodecylthio, phenylthio, 2-buthoxy-t- octylphenylthio, or tetrazolylthio), an arylsulfonyl group (for example, 2-butoxy-t-octylphenylsulfonyl), an arylsulfinyl group (for example, 2-butoxy-t-octylphenylsulfinyl), a carbamoylamino group (for example, N-methylcarbamoylamino, or N-phenylcarbamoylamino), a five-membered or six-membered nitrogen-containing heterocyclic group (for example, imidazolyl, pyrazolyl, triazolyl, tetrazolyl, or 1,2-dihydro-2-oxo-1-pyridyl), an imide group (for example, succinimide, or hydantoinyl), an arylazo group (for example, phenylazo, 4-methoxyphenylazo), or the like. These groups may further be substituted.

As a "coupler having a leaving group" to be used in the method for forming an azo colorant of the present invention, any known coupler can be used as long as it satisfies the specified reaction rate defined in the claims in relation to the diazo compound. In general, hetero five-membered cyclic compounds such as pyrrole, and active methylene compounds such as 1,3-diketone are preferable examples. In particular, couplers represented by above-mentioned general formulae (1) to (5) are preferable because a high improvement of rate is effected by introduction of a leaving group.

In the above-mentioned general formulae (1), (2) (3), (4), and (5), in a case where Y represents an amino group having a substituent, preferable substituents include an alkyl group, an aryl group, an alkylsulfonyl group, an arylsulfonyl group, an alkylcarbonyl group, an arylcarbonyl group, an alkylaminosulfonyl group, an arylaminosulfonyl group, an alkoxycarbonyl group, an aryloxycarbonyl group, an alkylphosphonyl group, an arylphosphonyl group, an alkenyl group, and the like. In a case where Y represents an alkyl group having a substituent, preferable substituents include an alkoxy group, an aryloxy group, a halogen atom, an alkylamino group, an arylamino group, a hydroxy group, an acyloxy group, an alkoxycarbonyl group, an acylamino group, and the like. In a case where Y represents an aryl group having a substituent, preferable substituents include an alkyl group, an aryl group, an alkoxy group, an aryloxy group, a halogen atom, an alkylamino group, an arylamino group, an amino group, a hydroxy group, an acyloxy group, an alkoxycarbonyl group, an acylamino group, and the like. In a case where Y represents an alkoxy group having a substituent, preferable substituents include those presented as preferable substituents for the alkyl group. Moreover, in a case where Y represents an aryloxy group having a substituent, preferable substituents include those presented as preferable substituents for the aryl group.

Furthermore, preferable substituents capable of being introduced to a functional group R include those substituents listed for Y. In a case where Z represents an amino group which may have a substituent, as a substituent capable of being introduced, those presented for an amino group for Y can be presented. In a case where a benzene ring, naphthalene ring, pyridine ring or quinoline ring of Ar has a substituent, as a preferable substituent, those presented for an aryl group for Y can be presented.

Specific compound examples (C-1) to (C-116) that can be used preferably in the present invention are shown below, but the present invention is not limited thereto. Here, examples of compounds belonging to general formula (1) are (C-1) to (C-69), examples of compounds belonging to general formula (2) are (C-70) to (C-82), examples of compounds belonging to general formula (3) are (C-83) to (C-96), examples of compounds belonging to general formula (4) are (C-97) to (C-105), and examples of compounds belonging to general formula (5) are (C-106) to (C-116).

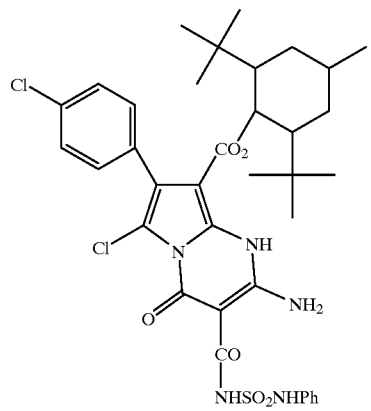

(C-1)

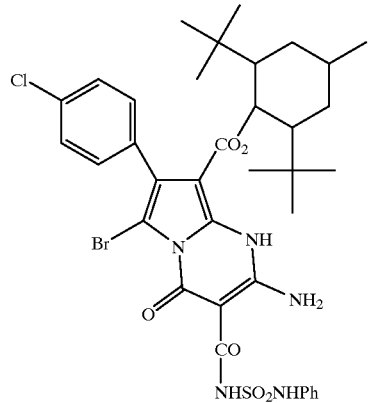

(C-2)

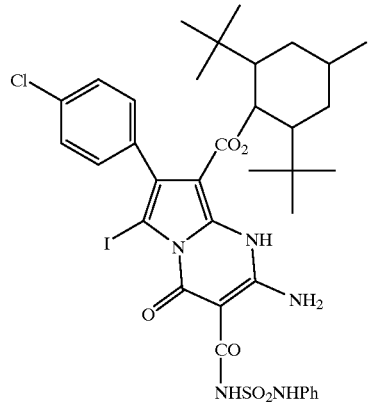

(C-3)

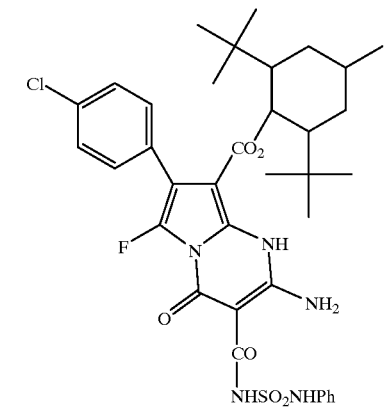
(C-4)
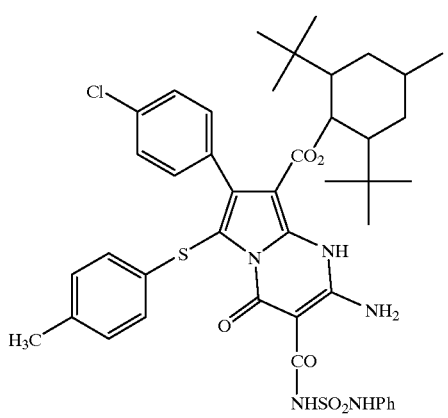
(C-5)
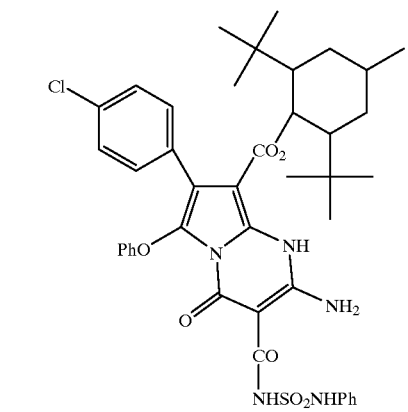
(C-6)
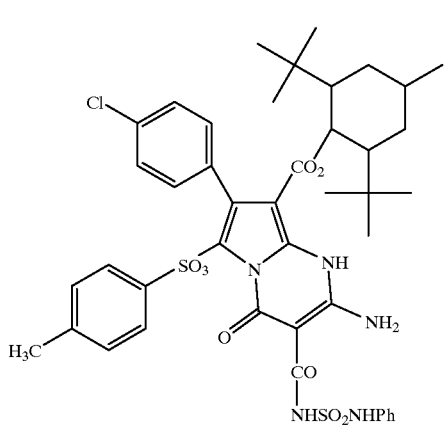
(C-7)
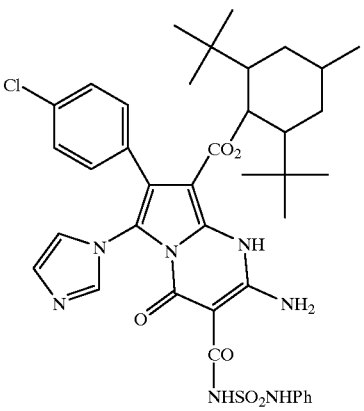
(C-8)
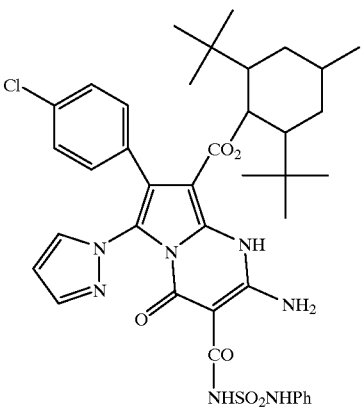
(C-9)
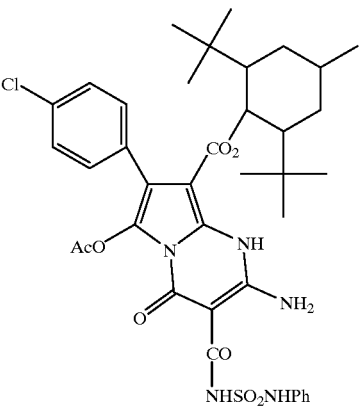
(C-10)
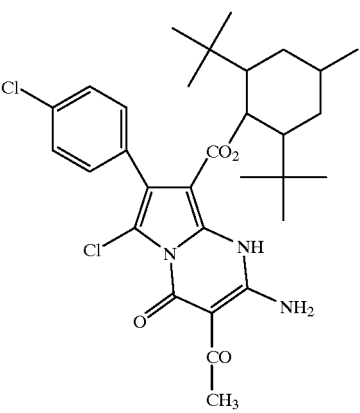
(C-11)

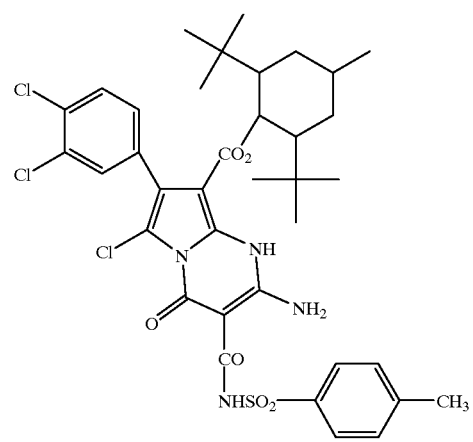
(C-12)
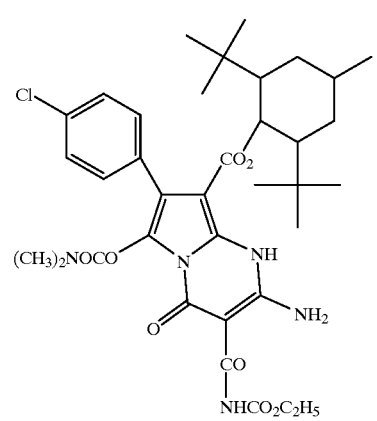
(C-13)
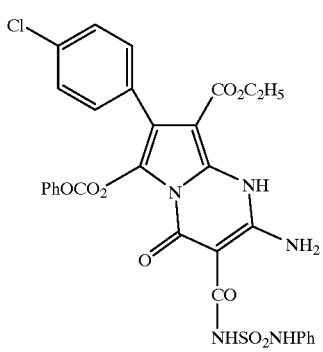
(C-14)
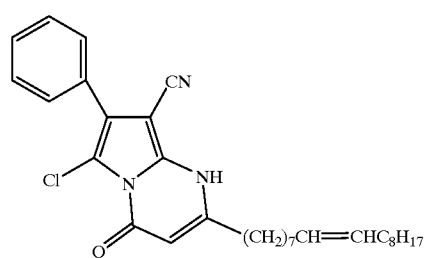
(C-15)
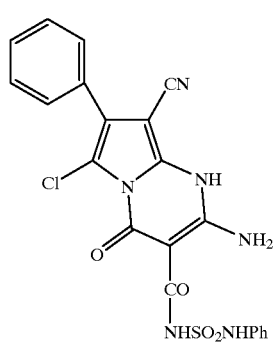
(C-16)
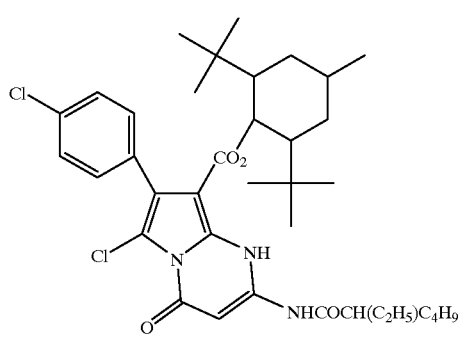
(C-17)
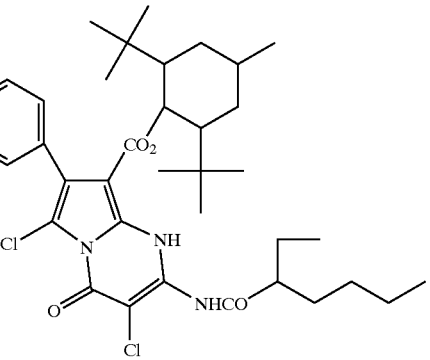
(C-18)
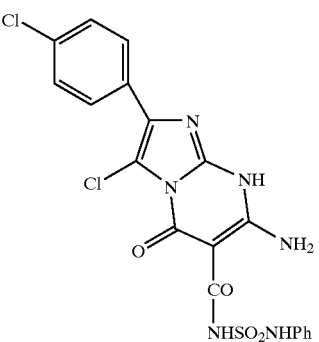
(C-19)

(C-20)
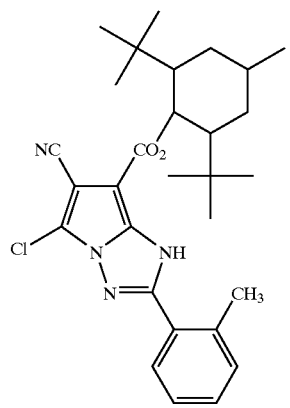
(C-21)
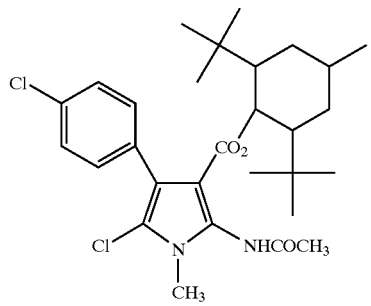
(C-22)
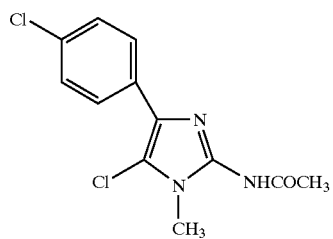
(C-23)
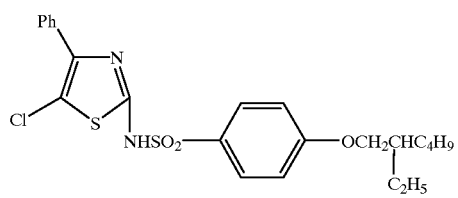
(C-24)
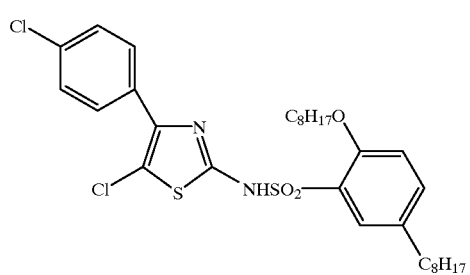
(C-25)
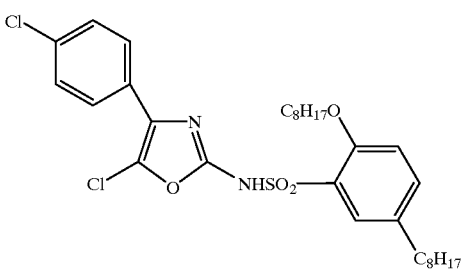
(C-26)
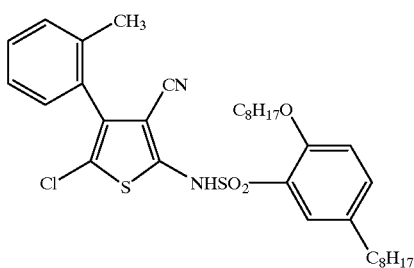
(C-27)
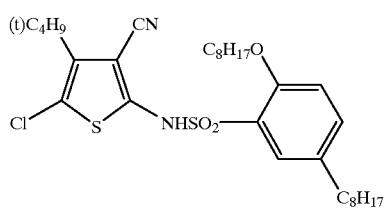
(C-28)
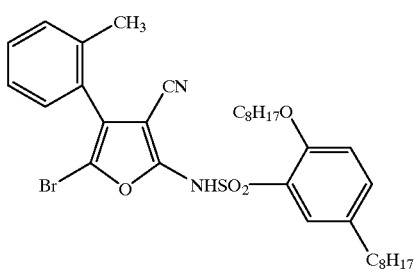
(C-29)
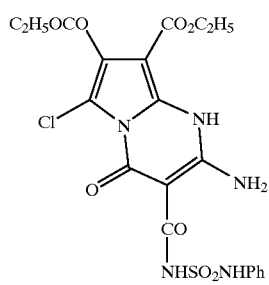

-continued
(C-30) 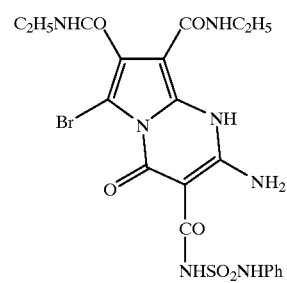
(C-31) 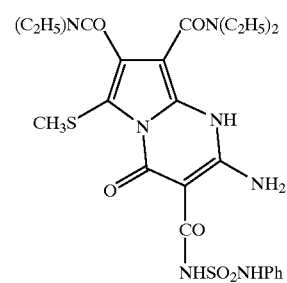
(C-32) 
(C-33) 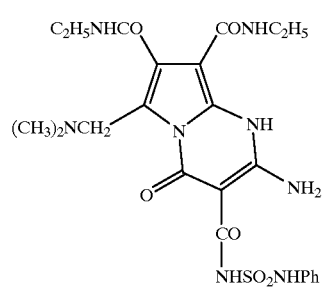
(C-34) 
-continued
(C-35) 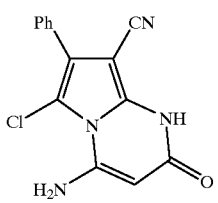
(C-36) 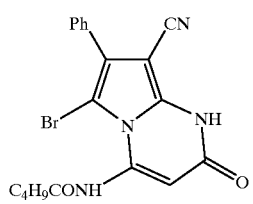
(C-37) 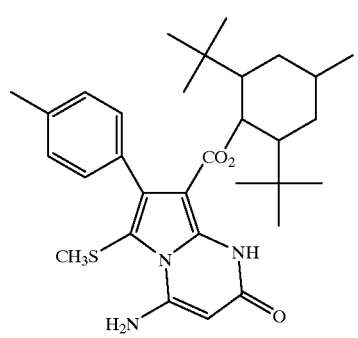
(C-38) 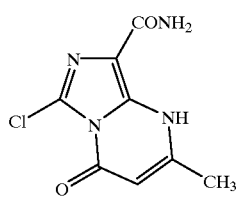
(C-39) 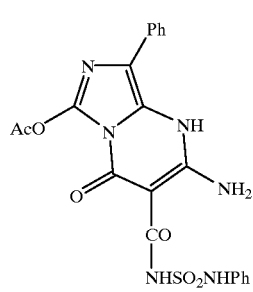
(C-40) 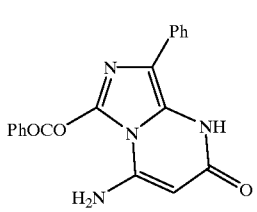

(C-41) 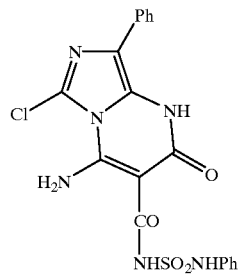
(C-42) 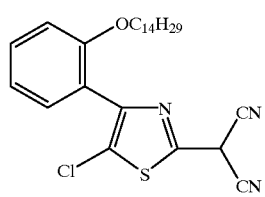
(C-43) 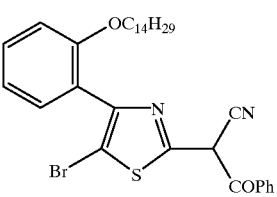
(C-44) 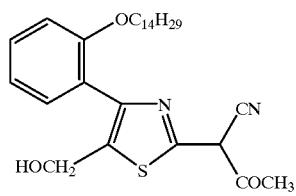
(C-45) 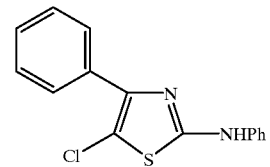
(C-46) 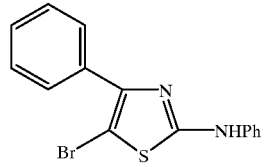
(C-47) 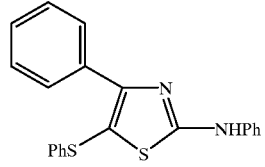
(C-48) 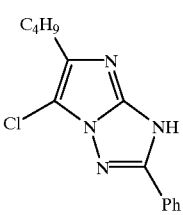
(C-49) 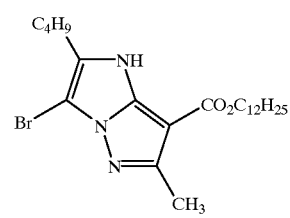
(C-50) 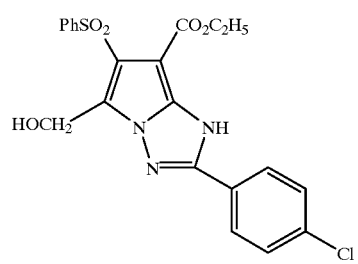
(C-51) 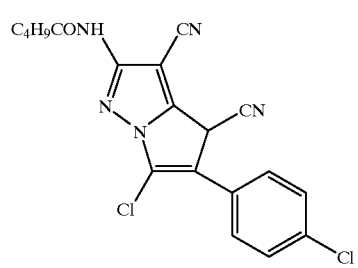
(C-52) 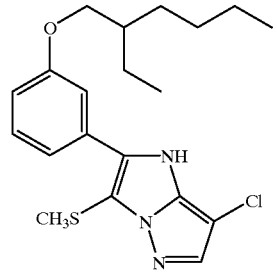
(C-53) 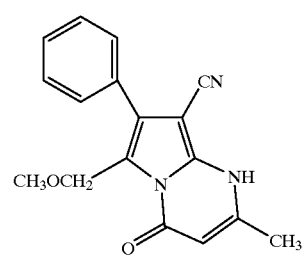

-continued
(C-54)
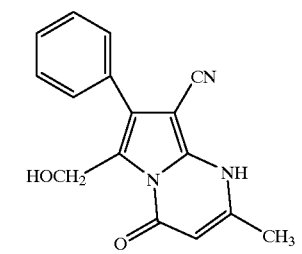
(C-55)
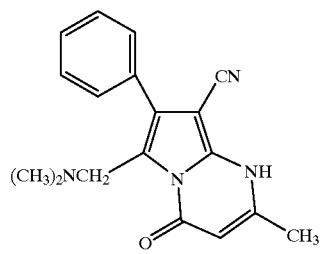
(C-56)
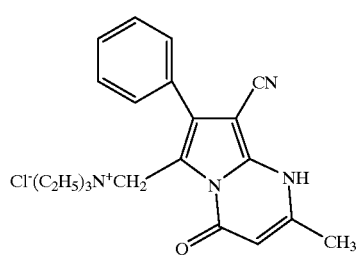
(C-57)
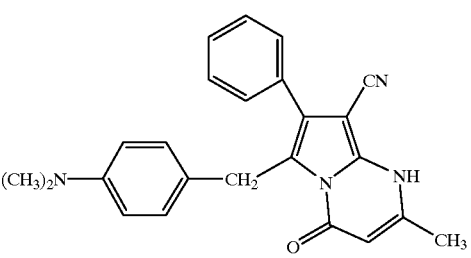
(C-58)
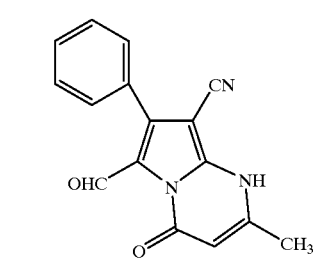
(C-59)
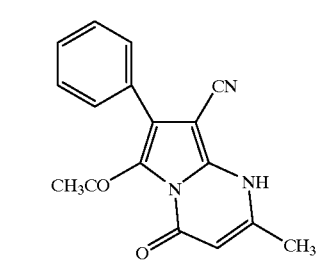
-continued
(C-60)
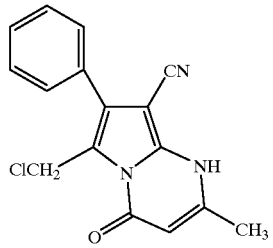
(C-61)
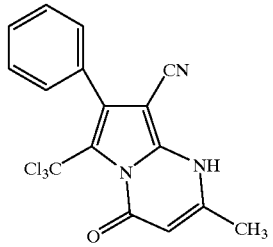
(C-62)
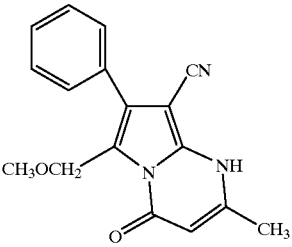
(C-63)
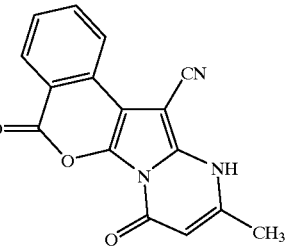
(C-64)
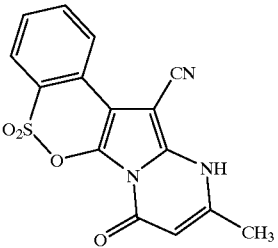
(C-65)

-continued
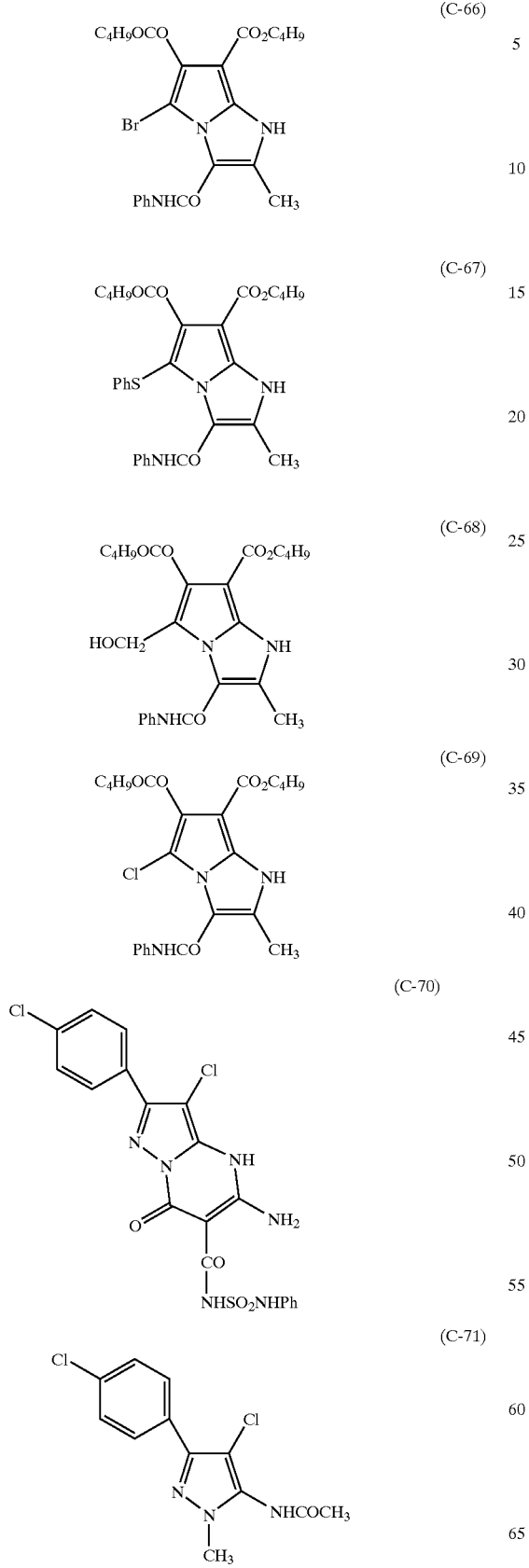
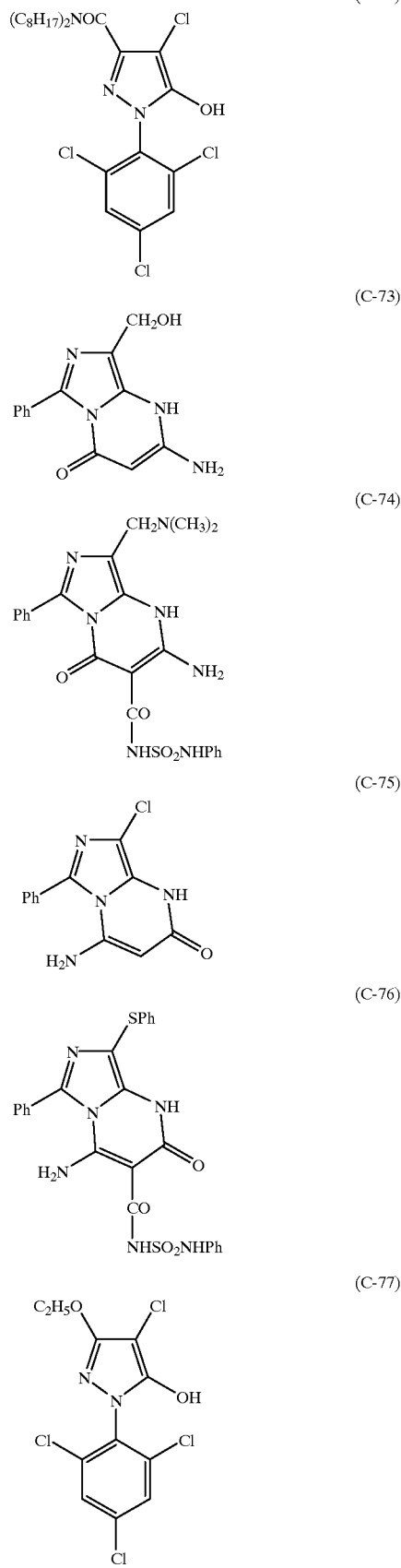

(C-78) 
(C-79) 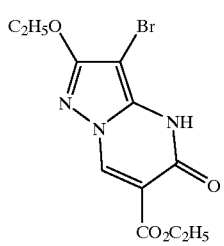
(C-80) 
(C-81) 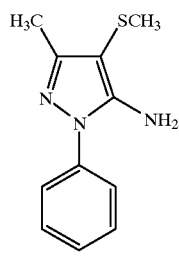
(C-82) 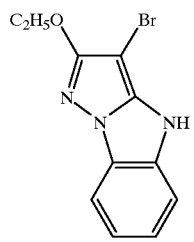
(C-83) 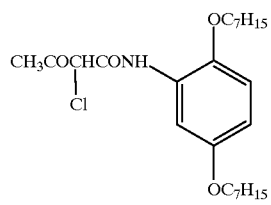
(C-84) 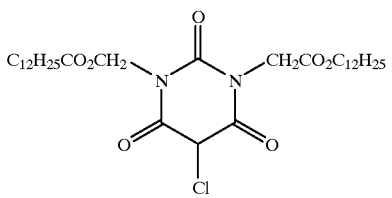
(C-85) 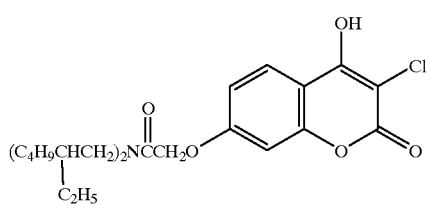
(C-86) 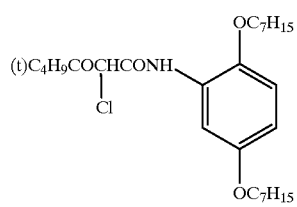
(C-87) 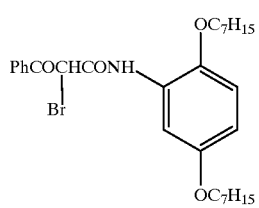
(C-88) 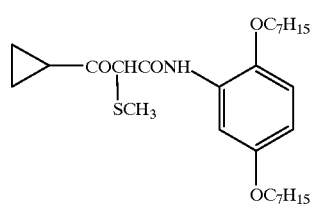
(C-89) 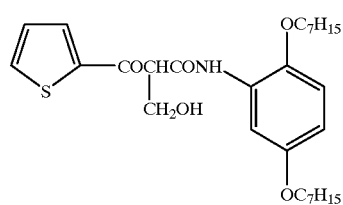
(C-90) 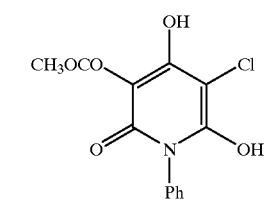
(C-91) 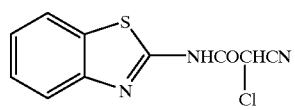

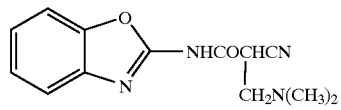
(C-92)
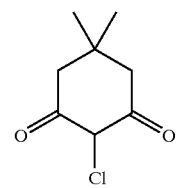
(C-93)
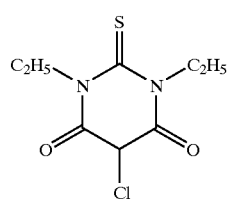
(C-94)
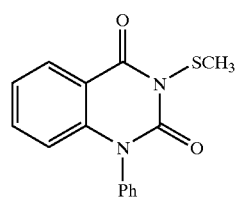
(C-95)
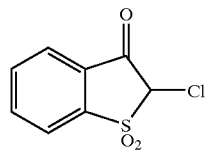
(C-96)
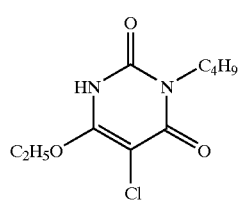
(C-97)
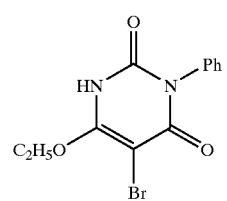
(C-98)
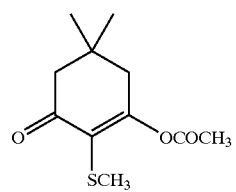
(C-99)
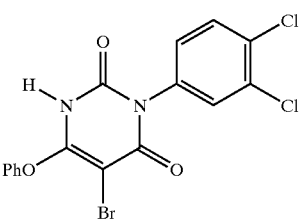
(C-100)
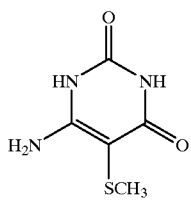
(C-101)
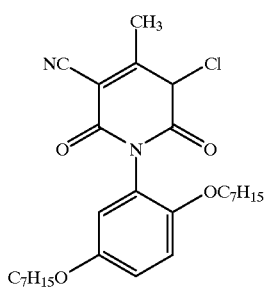
(C-102)
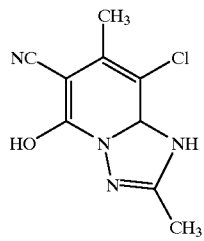
(C-103)
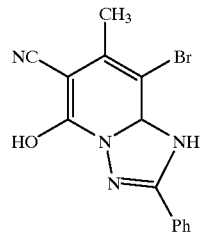
(C-104)
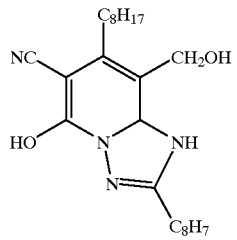
(C-105)

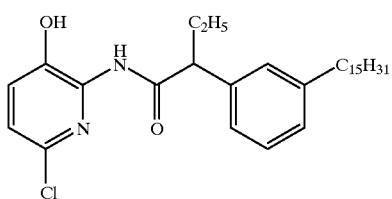
(C-106)

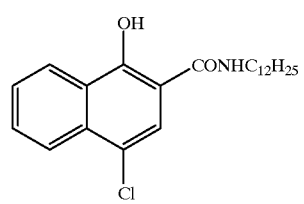
(C-107)

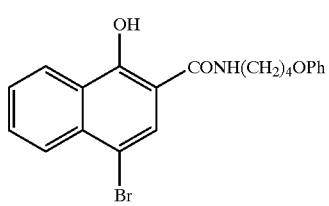
(C-108)

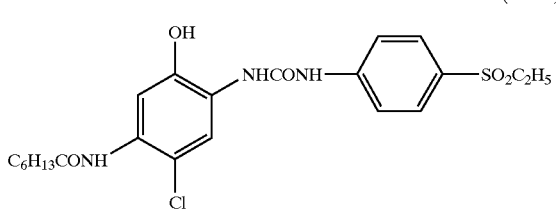
(C-109)

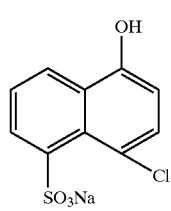
(C-110)

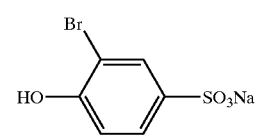
(C-111)

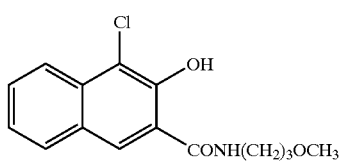
(C-112)

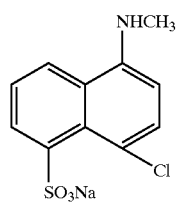
(C-113)

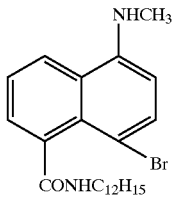
(C-114)

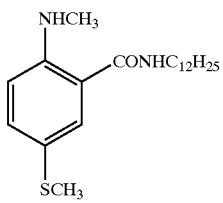
(C-115)

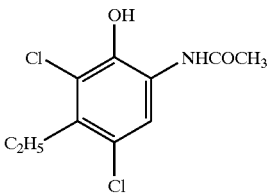
(C-116)

The coupler compound having a leaving group to be used in the present invention can be synthesized by various methods. In general, the coupler compound is obtained by reacting an appropriate halogenation agent with a corresponding coupler (with the coupling position not substituted), or by reacting an appropriate nucleophilic agent with a coupler that is chloro- or bromo-substituted at the coupling position. Examples of the halogenation agent include N-chlorosuccinimide, N-bromosuccinimide, N-iodosuccinimide, N-chlorohydantoin, bromine, tetrabutylammonium tribromide and the like. Examples of the nucleophilic agent include substituted phenol, substituted thiophenol, pyrazol, imidazol and the like.

In the reaction method of the present invention, the diazo compound for reacting with the coupler so as to develop color is not particularly limited, and any diazo compound represented by the following general formula (A) can be selected and used. The diazo compound is a compound that generates a coupling reaction with a coupler when heated so as to develop color, and is decomposed by light.

$$Ar-N_2^+X^-$$ general formula (A)

(In the formula, Ar denotes an aromatic group portion, and $X^-$ denotes an acid anion.)

In particular, diazo compounds represented by the following general formulae (6), (7), and (8) are preferable.

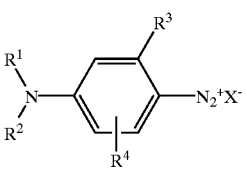
(6)

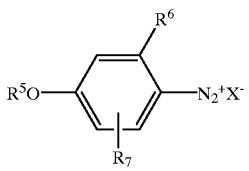

(7)

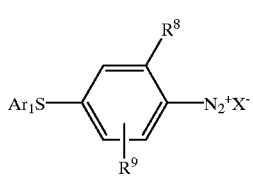

(8)

In general formulae (6) and (7), $R^1$ and $R^2$ represent a hydrogen atom or an alkyl group which may have a substituent. $R^1$ and $R^2$ may link with each other so as to form a heterocycle, but $R^1$ and $R^2$ cannot both be a hydrogen atom. $R^3$ represents an alkyl group, an alkoxy group, an aryloxy group, an alkylthio group, an arylthio group, an alkylsulfonyl group, or an arylsulfonyl group, which may each have a substituent. $R^4$ represents a hydrogen atom, or an alkyl group, or alkoxy group, which may each have a substituent. $R^5$ represents a hydrogen atom, or an alkyl group which may have a substituent. $R^6$ represents an alkyl group, an alkoxy group, an aryloxy group, an alkylthio group, or an arylthio group, which may each have a substituent. $X^-$ represents an acid anion.

In general formula (8), $Ar^1$ represents an aryl group which may have a substituent. $R^7$ and $R^8$ represent an alkyl group or aryl group, which may each have a substituent. $R^7$ and $R^8$ may be the same as each other or different. $X^-$ represents an acid anion.

In general formulae (6) and (7), if $R^1$ or $R^2$ represents an alkyl group having a substituent, as a preferable substituent, those presented as preferable substituents for an alkyl group of Y in the above-mentioned general formulae (1) to (5) can be presented.

Preferable functional groups in an alkyl group, an alkoxy group, an aryloxy group, an alkylthio group or an arylthio group at $R^3$ are the same as those presented for Y and R of the above-mentioned general formulae (1) to (5). Moreover, if $R^3$ represents an alkylsulfonyl group or arylsulfonyl group, having a substituent, those substituents presented for the alkyl group and the aryl group of Y can be presented.

If $R^4$ represents an alkyl group or an alkoxy group, having a substituent, those substituents listed for the alkyl group and alkoxy group of Y can be preferably introduced.

If one of $R^5$ to $R^8$ represents an alkyl group, an alkylthio group, or an alkoxy group, referable substituents that can be introduced include those substituents listed as substituents for the alkyl group of Y. If one of $R^5$ to $R^8$ represents an arylthio group or an aryloxy group, those substituents listed as substituents for the aryl group can be used preferably.

Since a diazo compound having such a structure has a high improvement of rate effected by introduction of the leaving group, the diazo compound can be used preferably.

Specific diazo compound examples (D-1) to (D-49) that can be used preferably in the present invention are shown below, but the present invention is not limited thereto.

(D-1)

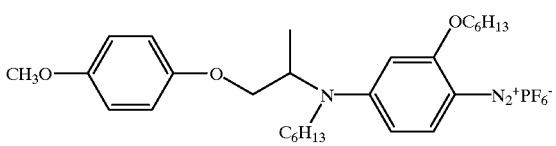

(D-2)

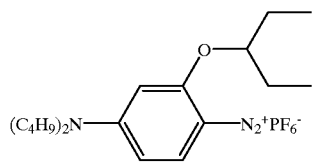

(D-3)

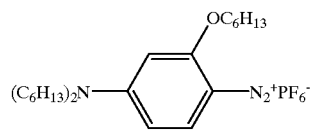

(D-4)

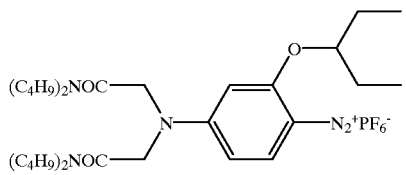

(D-5)

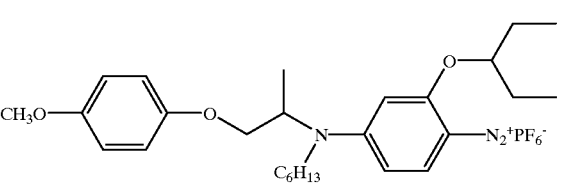

(D-6)

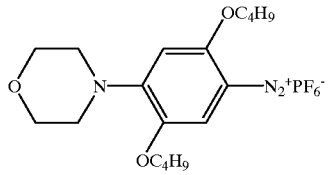

(D-7)

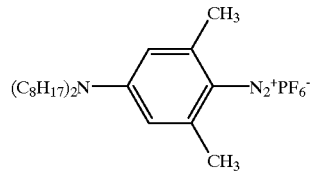

(D-8)

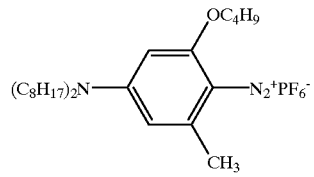

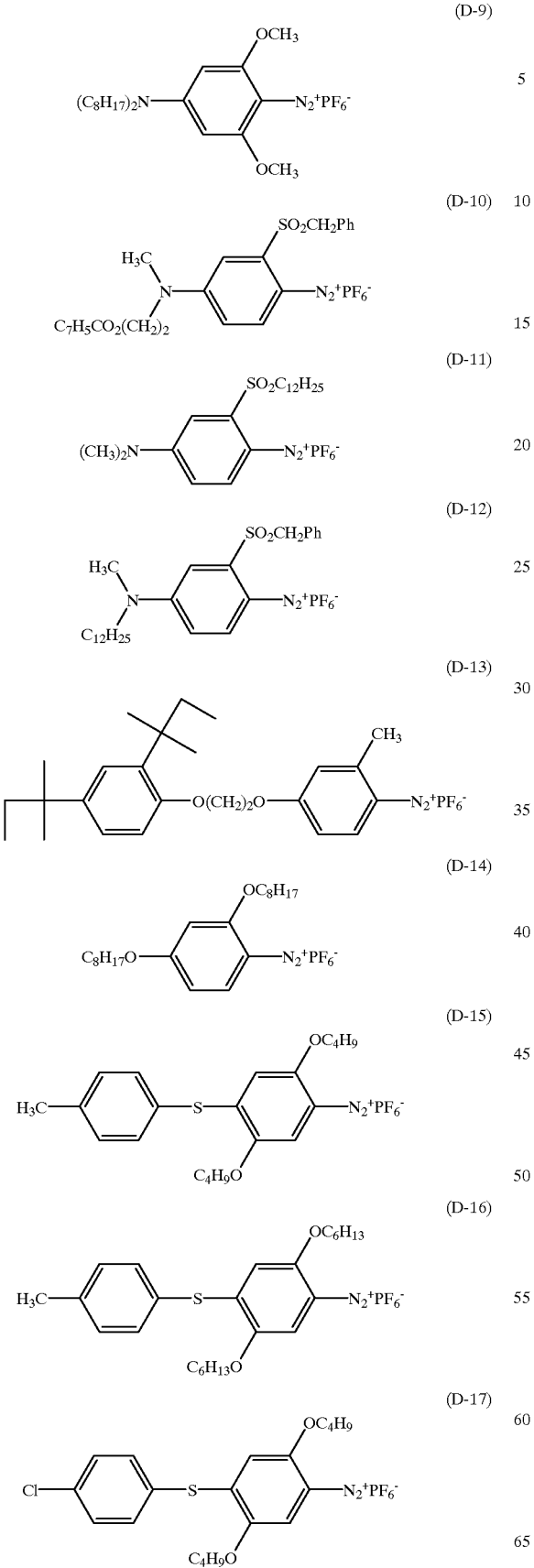
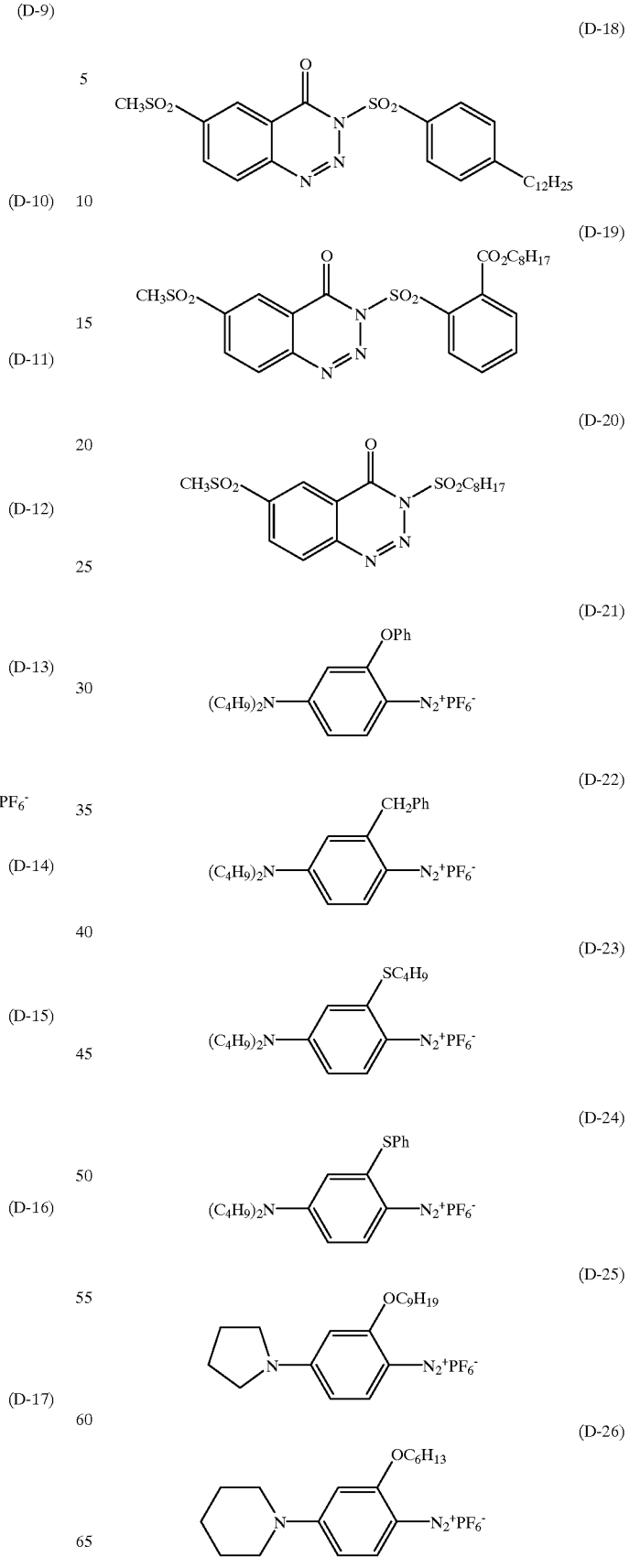

(D-27) through (D-44): chemical structures of diazonium salts.

-continued

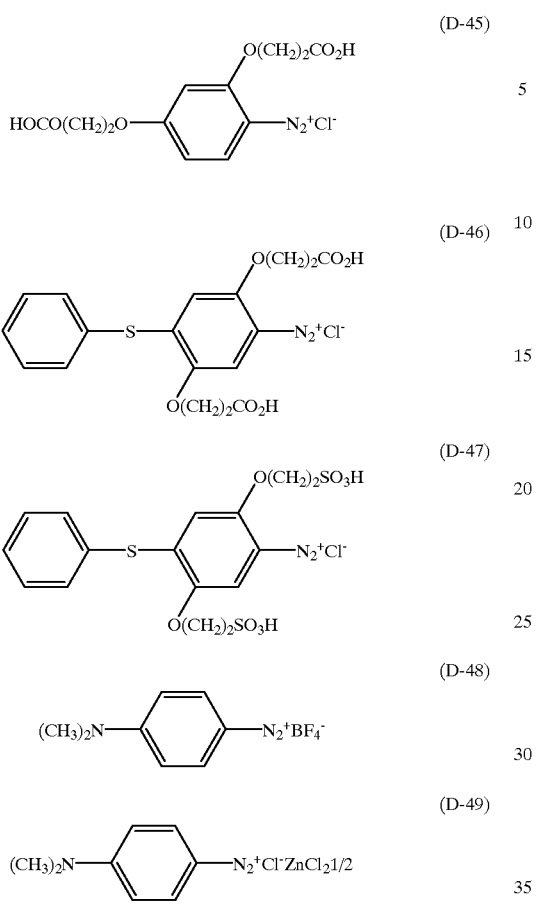

(D-45)
(D-46)
(D-47)
(D-48)
(D-49)

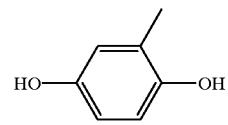

(R-1)

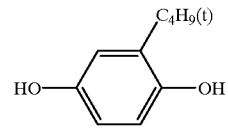

(R-2)

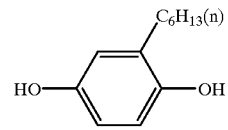

(R-3)

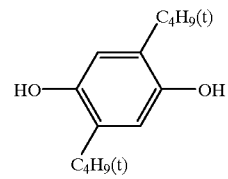

(R-4)

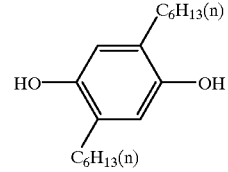

(R-5)

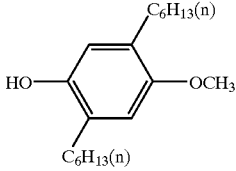

(R-6)

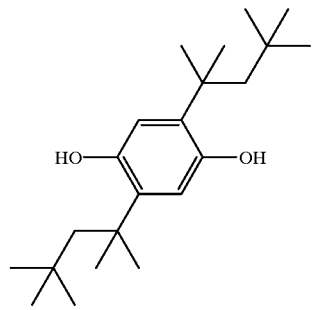

(R-7)

In the reaction method of the present invention, an amount ratio of the coupler and the diazo compound can be suitably selected according to the compounds to be used. The coupler is preferably used in a range of 1.0 to 10.0 parts by weight with respect to 1 part by weight of a diazonium salt compound, and more preferably in a range of 1.0 to 2.0 parts by weight. With less than 1.0 part by weight, sufficient color-developing property cannot be obtained. In contrast, with more than 10.0 parts by weight, the effect will not be further improved.

In the azo coupling reaction method of the present invention using the above-mentioned coupler having a leaving group, a sufficient reaction rate is obtained. In particular, this effect is remarkable if a coupler represented by one of the general formulae (1) to (3) and a diazo compound represented by one of the general formulae (6) and (7) are used. Furthermore, by adding a reducing agent, the reaction rate can be further improved.

Examples of the reducing agent to be used in the present invention include aminophenols, phenols, catechols, hydroquinones, amines, hydroxyamines, alcohols, thiols, sulfides, alkaline metals, alkaline earth metals, metal hydrides, hydrazines, phenidones, anilines, phenyl ethers, L-ascorbic acids and the like. Among these examples, the hydroquinones, the catechols, and the aminophenols are preferable. Non-limiting specific examples thereof, (R-1) to (R-78), are shown below.

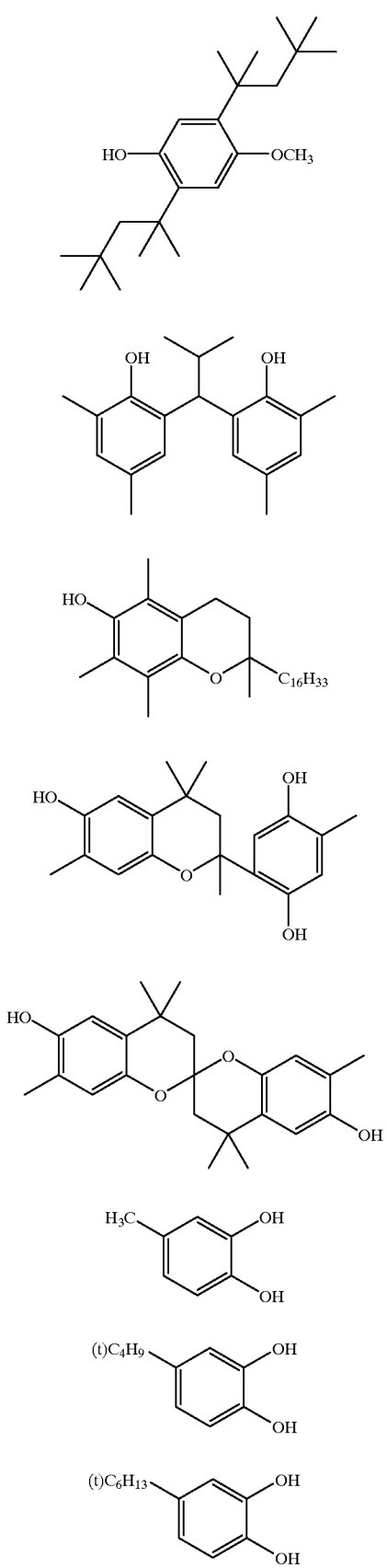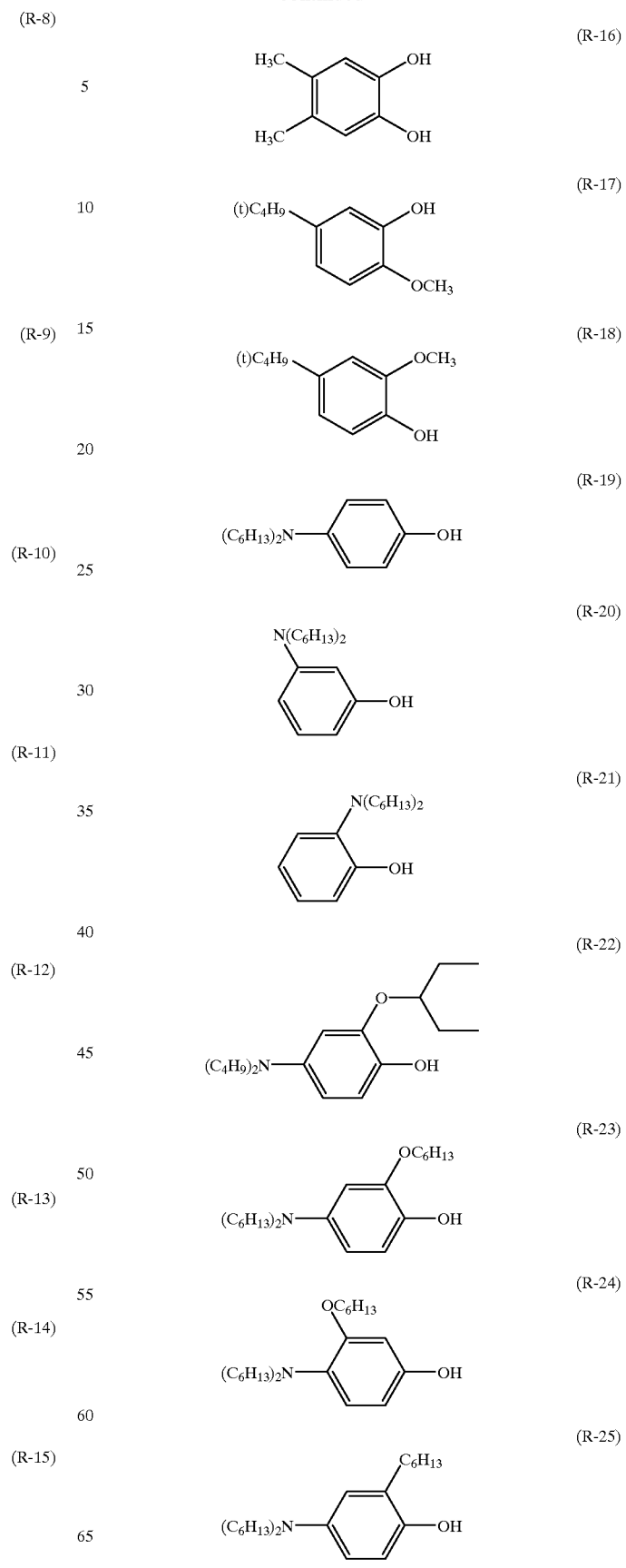

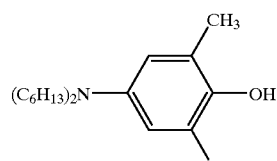 (R-26)
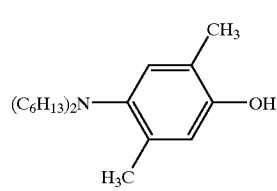 (R-27)
((n)C$_4$H$_9$)$_3$SnH (R-28)
Ph$_3$SnH (R-29)
((i)C$_4$H$_9$)$_2$AlH (R-30)
(C$_2$H$_5$)$_3$SiH (R-31)
Ph$_2$SiH$_2$ (R-32)
LiAlH$_4$ (R-33)
NaBH$_4$ (R-34)
LiBH$_4$ (R-35)
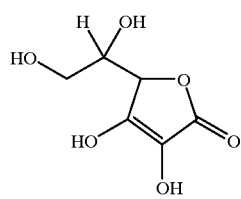 (R-36)
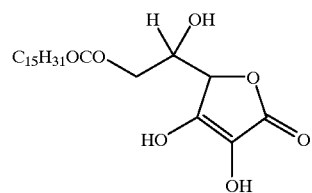 (R-37)
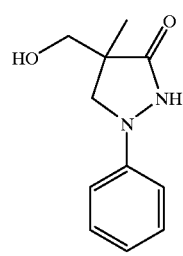 (R-38)
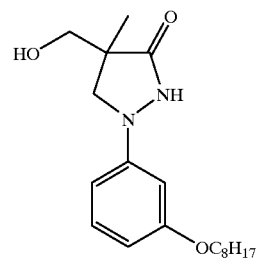 (R-39)
NH$_2$NH$_2$ (R-40)
PhNHNH$_2$ (R-41)
Na$_2$S$_2$O$_4$ (R-42)
HSCH$_2$C$_{10}$H$_{21}$ (R-43)
C$_8$H$_{17}$CO$_2$CH$_2$SCH$_2$CH$_2$SCH$_2$CO$_2$C$_8$H$_{17}$ (R-44)
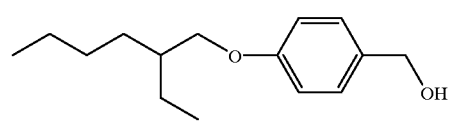 (R-45)
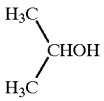 (R-46)
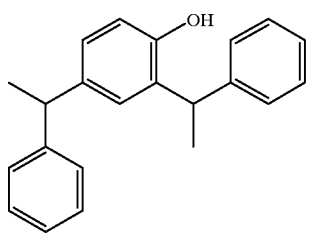 (R-47)
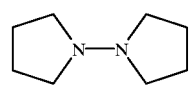 (R-48)
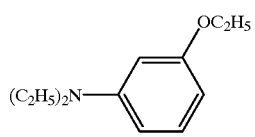 (R-49)
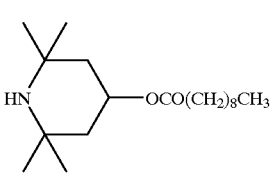 (R-50)

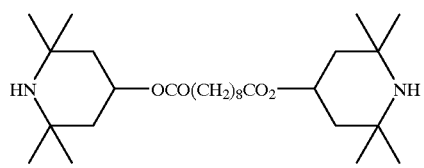
(R-51)
(R-52)
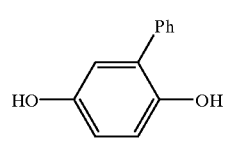
(R-53)
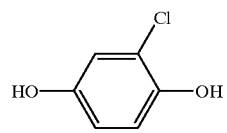
(R-54)
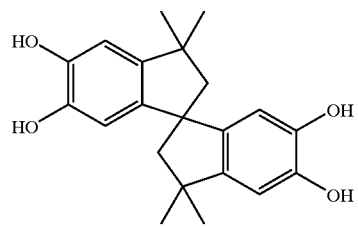
(R-55)
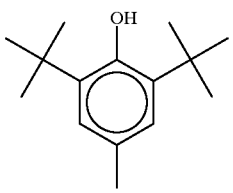
(R-56)
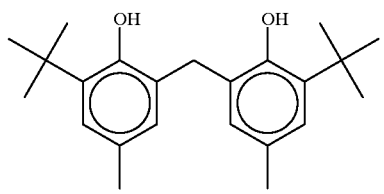
(R-57)
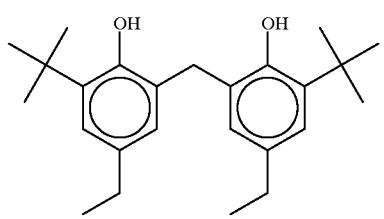
(R-58)
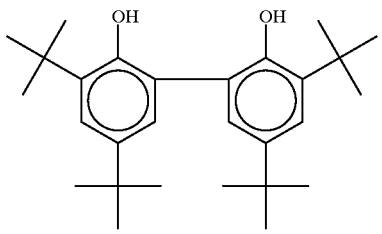
(R-59)
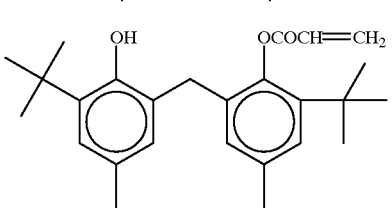
(R-60)
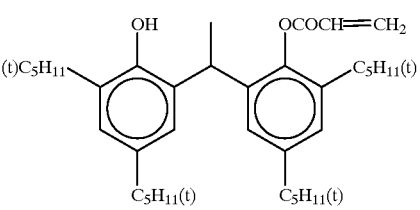
(R-61)
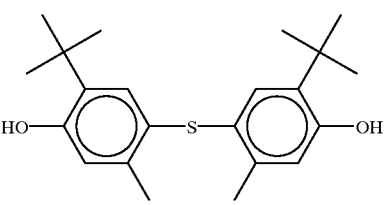
(R-62)
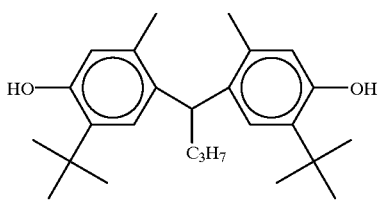
(R-63)
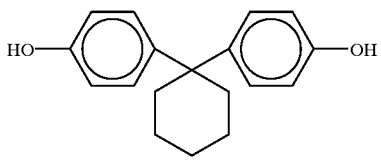
(R-64)
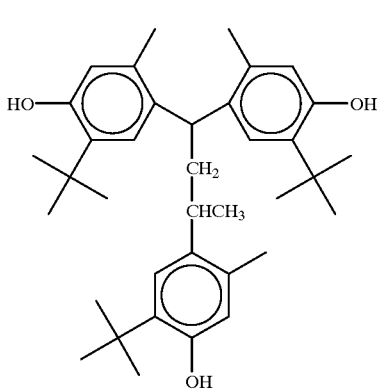
(R-65)

(R-66) 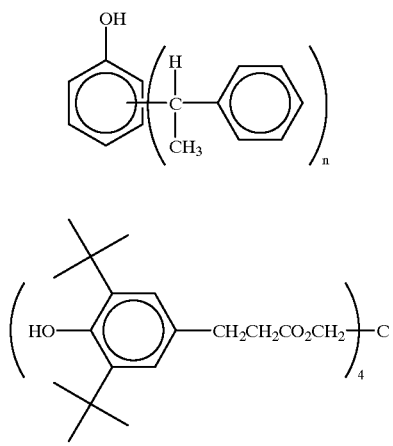

(R-67) 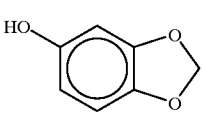

(R-68) 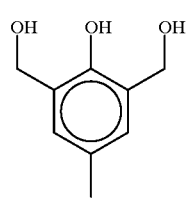

(R-69) 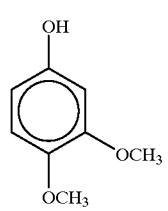

(R-70) 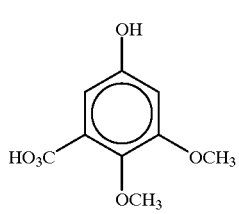

(R-71) 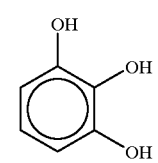

(R-72) 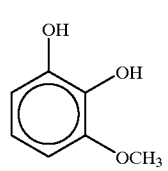

(R-73)

(R-74) 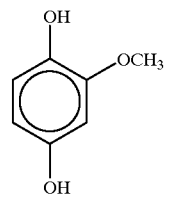

(R-75) 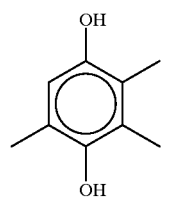

(R-76) 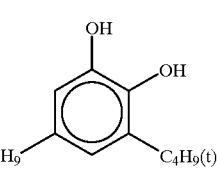

(R-77) 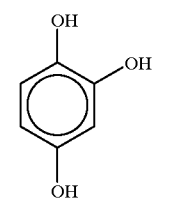

(R-78) 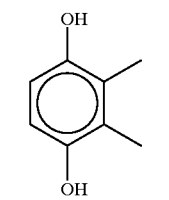

The amount of the reducing agent is not particular limited, but it is used preferably in a range of 1 to 10 moles with respect to 1 mole of the diazo compound.

In the present invention, an organic base can be used for promotion of the coupling reaction. As an organic base to be used, guanidines, tertiary amines, pyridines, piperidines, piperazines, amidines, formamidines, morpholines, and the like can be presented. Among these examples, the guanidines, and the tertiary amines are preferable. Moreover, the organic bases disclosed in Japanese Patent Application Laid-Open (JP-A) Nos. 57-123086, 60-49991, 60-94381, 9-71048, 9-77729, 9-77737, and the like can also be used.

Specific examples of organic bases to be used invention (B-1) to (B-38) are shown below, but the present invention is not limited thereto.

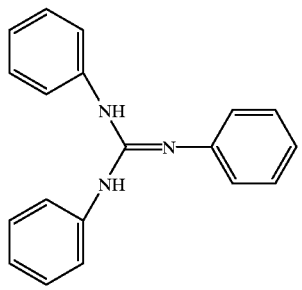
(B-1)
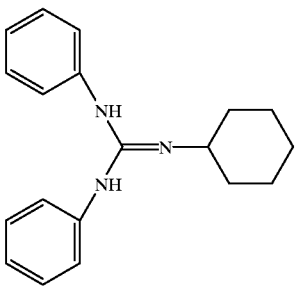
(B-2)
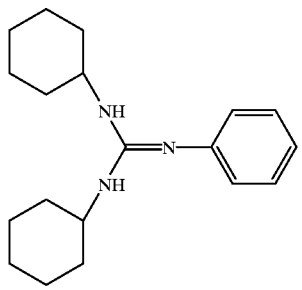
(B-3)
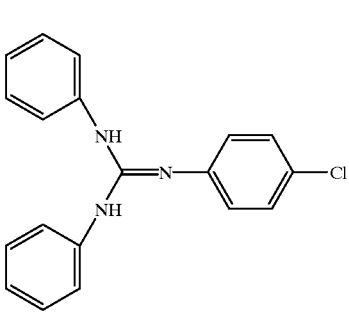
(B-4)
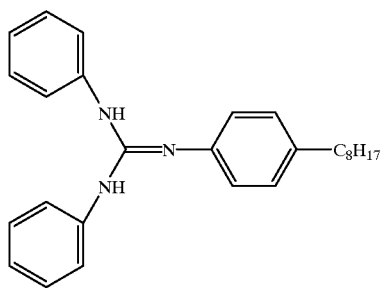
(B-5)
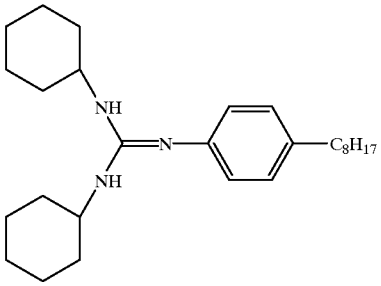
(B-6)
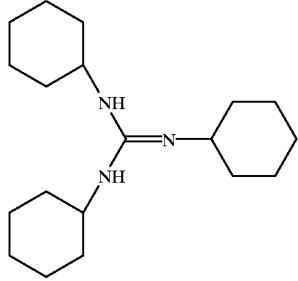
(B-7)
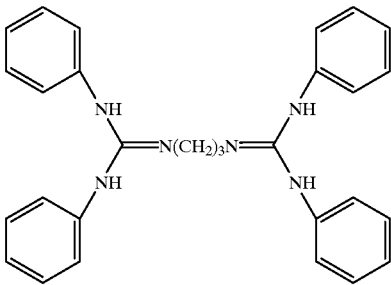
(B-8)
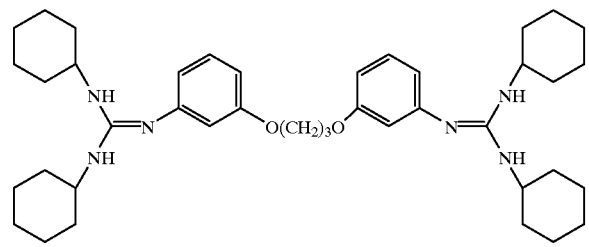
(B-9)
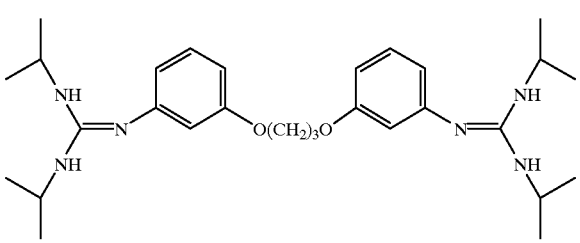
(B-10)

-continued

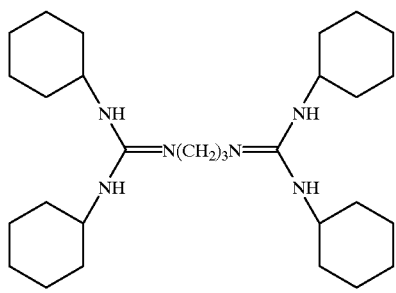
(B-11)

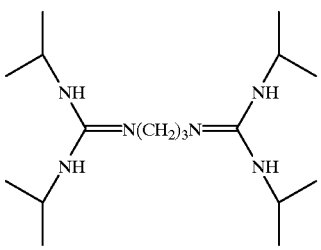
(B-12)

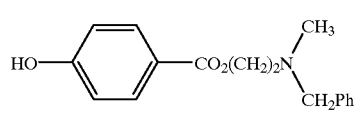
(B-13)

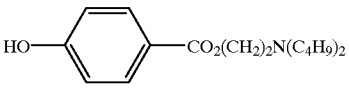
(B-14)

((n)C₈H₁₇)₃N (B-15)

((n)C₈H₁₇)₂NH (B-16)

(n)C₈H₁₇NH₂ (B-17)

((t)C₈H₁₇)₃N (B-18)

((t)C₈H₁₇)₂NH (B-19)

(t)C₈H₁₇NH₂ (B-20)

(PhCH₂)₃N (B-21)

(PhCH₂)₂NH (B-22)

PhCH₂NH₂ (B-23)

Ph₃N (B-24)

Ph₂NH (B-25)

PhNH₂ (B-26)

(B-27)

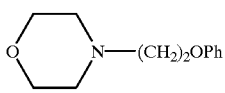
(B-28)

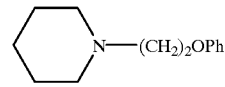
(B-29)

NaOH (B-30)

NaOAc (B-31)

KOAc (B-32)

KHCO₃ (B-33)

K₂CO₃ (B-34)

LiOH (B-35)

MgO (B-36)

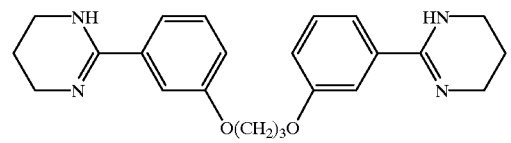
(B-37)

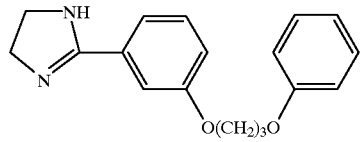
(B-38)

The amount of the organic base is not particularly limited, preferable usage is in a range of 1 to 30 moles with respect to 1 mole of the diazo compound.

As a solvent to be used in the reaction, n-hexane, ethyl acetate, butyl acetate, methanol, ethanol, acetonitrile, toluene, chloroform, N,N-diethyl formamide, N,N-diethyl formacetoamide, dimethyl sulfoxide, and the like can be presented. Among these examples, ethyl acetate, butyl acetate, methanol, ethanol, and toluene are preferable. The amount of the solvent is not particularly limited, but usage in a range of 5 to 100 moles with respect to 1 mole of the diazo compound is preferable.

The reaction temperature is not particularly limited, but performance in a range of 20° C. to 120° C. is preferable.

Examples of synthesis of azo colorants, using the method for forming an azo colorant of the present invention, will be shown below.

SYNTHESIS EXAMPLE

Synthesis Example 1 of Azo Colorant 1

7.48 g (10 mmol) of a coupler (the above-mentioned compound (C-1)) and 3.16 g (11 mmol) of a base (TPG: triphenylguanidine, aforementioned compound (B-1)) were dissolved in 100 ml of methanol at room temperature. 4.63 g (10 mmol) of a diazo compound (aforementioned compound (D-2)) was added, and the solution was agitated for 0.5 h at room temperature. Precipitated crystals were filtered, washed with methanol, and dried at room temperature so as to obtain 7.2 g (7 mmol) of azo colorant 1.

Synthesis Example 2 of Azo Colorant 1

7.48 g (10 mmol) of a coupler (the above-mentioned compound (C-1)), 3.16 g (11 mmol) of a base (TPG: triphenylguanidine, aforementioned compound (B-1)), and 1.38 g (10 mmol) of a reducing agent (the above-mentioned specific compound (R-1)) were dissolved in 100 ml of methanol at room temperature. 4.63 g (10 mmol) of a diazo compound (aforementioned compound (D-2)) was added, and the solution was agitated for 0.5 h at room temperature. Precipitated crystals were filtered, washed with methanol, and dried at room temperature so as to obtain 9.3 g (9 mmol) of azo colorant 1.

Synthesis Example 3 of Azo Colorant 1

7.1 g (10 mmol) of a coupler (the above-mentioned compound (C-1) with the chlorine leaving group replaced with a hydrogen atom) and 3.16 g (11 mmol) of a base (TPG: triphenylguanidine, aforementioned compound (B-1)) were dissolved in 100 ml of methanol at room temperature. 4.63 g (10 mmol) of a diazo compound (aforementioned compound (D-2)) was added, and the solution was agitated for 5.0 h at room temperature. Precipitated crystals were filtered, washed with methanol, and dried at room temperature so as to obtain 5.2 g (5 mmol) of azo colorant 1.

The colorants obtained in the synthesis examples 1, 2, and 3 were confirmed to all be the same azo colorant 1.

azo colorant 1

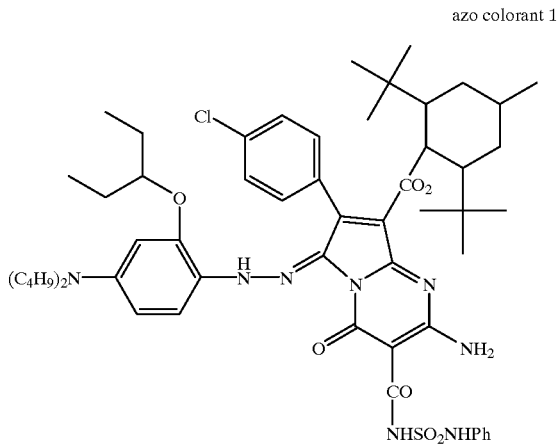

Moreover, the method for forming an azo colorant of the present invention can also be applied to a solid phase reaction system as disclosed in reports (Indian journal of Chemistry, vol. 38B, 721–723, 1999).

Next, a recording material of the present invention will be explained.

A recording material of the present invention has on a support, at least one photosensitive and heat-sensitive recording layer containing a diazo compound and a coupler that reacts with the diazo compound for developing color, and other layers as needed.

First, the recording layer will be explained.

The recording layer contains the diazo compound and the coupler that reacts with the diazo compound for developing color, and other components as needed. In the present invention, the recording layer should include a coupler having a leaving group at a coupling position thereof, such that coupling reaction rate with the diazo compound is faster than it would be if a coupler not having a leaving group (i.e. a coupler having a hydrogen at a coupling position) was used.

It is further preferable that the coupler to be used in the recording material not only has a leaving group so as to improve the coupling reaction rate with the diazo compound compared with a case of using a coupler not having a leaving group, but also satisfies a condition that the coupling reaction rate constant k thereof is 0.1 ($s^{-1}$) or more.

As the "coupler having a leaving group" contained in the recording material of the present invention, any known coupler can be used that satisfies the reaction rate conditions defined in the claims, in relation with the diazo compound. In particular, the couplers represented by the above-mentioned general formulae (1) to (5) are preferable for effecting a high improvement in the rate by introduction of the leaving group.

Examples of the leaving group L of the coupler to be preferably used in the present invention, and examples of preferable specific compounds (C-1) to (C-116) are the same as in the foregoing explanation of the azo colorant forming reaction method.

The coupler in the present invention is for forming a colorant by coupling with the diazo compound in a basic atmosphere or a neutral atmosphere. The coupler having a leaving group according to the present invention may be used in combination with a known coupler compound (not having a leaving group) in accordance with various purposes such as hue adjustment. Examples of the known coupler compound to be used in such combination include "active methylene compounds" having a methylene group adjacent to a carbonyl group, phenol derivatives, naphthol derivatives, and the like. Specific examples thereof include the below-mentioned, which can be used in a range suiting the object of the present invention.

Particularly preferable examples of a coupler to be used in combination in the present invention, besides compounds having a hydrogen atom in place of the leaving group at the coupling position in the above-mentioned compounds (C-1) to (C-116) (that is, compounds not having a leaving group), include resorcin, phloroglucin, 2,3-dihydroxynaphthalene, sodium 2,3-dihydroxynaphthalene-6-sulfonate, 1-hydroxy-2-naphthoic acid morpholinopropylamide, sodium 2-hydroxy-3-naphthalenesulfonate, 2-hydroxy-3-naphthalenesulfonic acid anilide, 2-hydroxy-3-naphthalenesulfonic acid morpholinopropylamide, 2-hydroxy-3-naphthalenesulfonic acid 2-ethylhexyloxypropylamide, 2-hydroxy-3-naphthalene sulfonic acid 2-ethylhexylamide, 5-acetoamide-1-naphthol, sodium 1-hydroxy-8-acetoamide naphthalene-3,6-disulfonate, 1-hydroxy-8-acetoamide naphthalene-3,6-disulfonic acid dianilide, 1,5-dihydroxynaphthalene, 2-hydroxy-3-naphthoic acid morpholinopropylamide, 2-hydroxy-3-naphthoic acid octylamide, 2-hydroxy-3-naphthoic acid anilide, 5,5-dimethyl-1,3-cyclohexanedione, 1,3-cyclopentanedione, 5-(2-n-tetradecyloxyphenyl)-1,3-cyclohexanedione, 5-phenyl-4-methoxycarbonyl-1,3-cyclohexanedione, 5-(2,5-di-n-octyloxyphenyl)-1,3-cyclohexanedione, N,N'-dicyclohexyl barbiturate, N,N'-di-n-dodecyl barbiturate, N-n-octyl-N'-n-octadecyl barbiturate, N-phenyl-N'-(2,5-di-n-octyloxyphenyl)barbiturate, N,N'-bis(octadecyloxycarbonylmethyl)barbiturate, 1-phenyl-3-methyl-5-pyrazolone, 1-(2,4,6-trichlorophenyl)-3-anilino-5-pyrazolone, 1-(2,4,6-trichlorophenyl)-3-benzamide-5-pyrazolone, 6-hydroxy-4-methyl-3-cyano-1-(2-ethylhexyl)-2-pyridone, 2,4-bis-(benzoylacetoamide)toluene, 1,3-bis-(pivaloylacetamidemethyl)benzene, benzoylacetonitrile, thenoylacetonitrile, acetoacetoanilide, benzoylacetoanilide, pivaloylacetoanilide, 2-chloro-5-(N-n-butylsulfamoyl)-1-pivaloylacetoamidebenzene, 1-(2-ethylhexyloxypropyl)-3-cyano-4-methyl-6-hydroxy-1,2-dihydropyridine-2-one, 1-(dodecyloxypropyl)-3-acethl-4-methyl-6-hydroxy-1,2-dihydropyridine-2-one, 1-(4-n-octyloxyphenyl)-3-tert-butyl-5-aminopyrazol, and the like.

Details of these coupler compounds are disclosed in JP-A Nos. 4-201483, 7-223367, 7-223368, 7-323660, Japanese Patent Application Nos. 5-278608, 5-297024, 6-18669, 6-18670, 7-316280, 8-027095, 8-027096, 8-030799, 8-12610, 8-132394, 8-358755, 8-358756, 9-069990, and the like.

The total amount of coupler compounds in the present invention is preferably 0.2 to 8 by mole ratio with respect to the diazonium salt compound in the recording layer, and more preferably 0.5 to 4 by mole ratio in view of effect.

With an amount less than 0.2 by mole ratio with respect to the diazonium salt compound, sufficient color-developing property may not be obtained. In contrast, with an amount more than 8 by mole ratio, coating suitability may be deteriorated.

The coupler compound in the present invention may be used in the form of a solid dispersion obtained by dispersing the coupler, water-soluble polymer and other components using a sand mill or the like. The coupler compound can also be used as an emulsion with an appropriate emulsifying auxiliary agent. The solid dispersion method and the emulsification method are not particularly limited, and conventional known methods can be used. Details of these methods are disclosed in JP-A Nos. 59-190886, 2-141279, and 7-17145.

In a specific emulsifying method, it is preferable to provide an emulsion by dissolving the coupler in an organic solvent hardly soluble or insoluble in water, and mixing this solution with a water phase having a surfactant and/or a water-soluble polymer as a protection colloid. From the viewpoint of facilitating dispersion, it is preferable to use a surfactant.

An organic solvent to be used in this case is, for example, any one suitably selected from the high-boiling-point oils disclosed in JP-A No. 2-141279.

Among these examples, it is preferable to use esters from the viewpoint of stability of the emulsion. Specific examples include triphenyl phosphate, tricresyl phosphate, trixylyl phosphate, tricyclohexyl phosphate, dibutyl phthalate, dioctyl phthalate, diphenyl phthalate, and the like.

Among these examples, it is preferable if tricresyl phosphate is used alone, or as a mixture, because emulsion stability of a color-developing agent will be particularly good.

The above-mentioned oils may be used in combination with each other, or with other oils.

It is also possible to further add an auxiliary solvent, a low-boiling-point dissolution auxiliary agent, to the above-mentioned organic solvent. Particularly preferable examples of such an auxiliary solvent include ethyl acetate, isopropyl acetate, butyl acetate, methylene chloride, and the like. In some cases, the low-boiling-point auxiliary solvent may be used and the high-boiling-point oil not included.

As a water-soluble polymer to be contained as a protection colloid in the water phase which is to be mixed with the oil phase containing the above components, any one can be suitably selected from known anionic polymers, nonionic polymers, and amphoteric polymers. Preferable examples of the water-soluble polymer include polyvinyl alcohol, gelatin, cellulose derivatives, and the like.

Moreover, as a surfactant to be contained in the water phase, any one can be suitably selected and used from anionic and nonionic surfactants that do not cause precipitation or aggregation by reaction with the above-mentioned protection colloid. Preferable examples of the surfactant include sodium alkylbenzenesulfonate, sodium alkylsulfate, dioctyl sodium sulfosuccinate, a polyalkylene glycol (such as polyoxyethylene nonyl phenyl ether), and the like.

The emulsion to be used in the recording material of the present invention can be obtained easily by mixing and dispersing the oil phase containing the above-mentioned components and the water phase containing the protection colloid and the surfactant using a means used for usual fine particle emulsification, such as high speed agitation, ultrasonic dispersion or the like.

Furthermore, the ratio of the oil phase to the water phase (oil phase weight/water phase weight) is preferably 0.02 to 0.6, and particularly preferably 0.1 to 0.4. With a ratio less than 0.02, the water phase is so much that the liquid is thin and sufficient color-developing property cannot be obtained. In contrast, with a ratio more than 0.6, liquid viscosity is too high, and handling difficulties and deterioration of coating liquid stability are brought about.

In the case of solid dispersion of the coupler, crystals of the coupler may be introduced into an aqueous solution of a water-soluble polymer and processed to fine particles using a dispersion means, such as a ball mill, a sand mill or the like. In this case, a dispersion auxiliary agent such as a surfactant or the like can be suitably used.

A diazo compound to be reacted with the above-mentioned coupler for developing color will be explained.

The diazo compound contained in the recording layer of the recording material of the present invention so as to be reacted with the above-mentioned coupler for developing color is not particularly limited, and any diazo compound represented by the following general formula (A) can be selected and used. These diazo compounds are compounds that cause a coupling reaction with the coupler when heated so as to develop color, and are decomposed by light.

  general formula (A)

(In the formula, Ar denotes an aromatic group portion, and X⁻ denotes an acid anion.)

In particular, the diazo compounds represented by general formulae (6), (7), and (8) previously explained for the azo colorant forming reaction method, are preferable.

Examples of the diazo compound to be used for the recording layer include, specifically, 4-(p-tolylthio)-2,5-dibuthoxybenzenediazonium, 4-(4-chlorophenylthio)-2,5-dibuthoxybenzenediazonium, 4-(N,N-dimethylamino)benzenediazonium, 4-(N,N-diethylamino)benzenediazonium, 4-(N,N-dipropylamino)benzenediazonium, 4-(N-methyl-N-benzylamino)benzenediazonium, 4-(N,N-dibenzylamino)benzenediazonium, 4-(N-ethyl-N-hydroxyethylamino)benzenediazonium, 4-(N,N-diethylamino)-3-methoxybenzenediazonium, 4-(N,N-dimethylamino)-2-methoxybenzenediazonium, 4-(N-benzoylamino)-2,5-diethoxybenzenediazonium, 4-morpholino-2,5-dibutoxybenzenediazonium, 4-anilinobenzenediazonium, 4-[N-(4-methoxybenzoyl)amino]-2,5-diethoxybenzenediazonium, 4-pyrolidino-3-ethylbenzenediazonium, 4-[N-(1-methyl-2-(4-methoxyphenoxy)ethyl)-N-hexylamino]-2-hexyloxybenzenediazonium, 4-[N-(2-(4-methoxyphenoxy)ethyl)-N-hexylamino]-2-hexyloxybenzenediazonium, 2-(1-ethylpropyloxy)-4-[di-(di-n-butylaminocarbonylmethyl)amino]benzenediazonium, and the like.

These diazo compounds are used preferably because of effecting a high improvement of rate by introduction of a leaving group. Moreover, as examples of preferable diazo compounds to be used in the recording layer of the present invention, the specific diazo compound examples (D-1) to (D-49) previously explained for the azo colorant forming reaction method can be presented, but the present invention is not limited thereto.

From the viewpoint of effect, a maximum absorption wavelength λmax of the diazonium salt compound used in the present invention is preferably 450 nm or less, and further preferably 290 to 440 nm. If the diazonium salt compound has a λmax longer than the long wavelength side of this wavelength region, the raw storability may be deteriorated. In contrast, if the λmax is at the short wavelength side, the image fixing property and image storability may be deteriorated when combined with the coupler compound.

In the recording material of the present invention, the diazonium salt compounds represented by the general formulae (6) to (8) can be used alone or in a combination of two or more. Furthermore, the diazonium salt compounds represented by the general formulae (6) to (8) can be used in combination with conventional diazonium salt compounds according to various purposes such as hue adjustment.

The amount of the diazonium salt compound in the recording material of the present invention is preferably 0.02 to 3 g/m² in the recording layer, and more preferably 0.1 to 2 g/m².

In the present invention, the diazonium salt compound is preferably contained in microcapsules, in view of storage stability.

A method for providing microcapsules is not particularly limited, and any method can be suitably selected from known methods for forming microcapsules.

Of these, it is particularly preferable to use an interfacial polymerization method of dissolving or dispersing color-forming components in a hydrophobic organic solvent that is to become the core of the capsules, to make an oil phase, mixing the oil phase with an aqueous phase in which a water-soluble polymer is dissolved, emulsifing with a homogenizer or the like, and then heating to cause a polymer-forming reaction at oil droplet surfaces and thereby form high polymer microcapsule walls.

This interfacial polymerization method can form consistently-sized microcapsules in a short time, and can provide a recording material with excellent pre-use preservability.

In the present invention, the microcapsule walls (below referred to simply as "capsule walls") have a material isolating effect at usual temperatures, so as to prevent contact between materials inside and outside the capsules. It becomes possible for the materials inside and outside to make contact only when a temperature above a certain value is applied. This characteristic of the capsule can be freely controlled by appropriate selection of a capsule wall material, capsule core material (material held inside the capsule), additives and the like.

The capsule wall material for the present invention is added inside and/or outside the oil droplets.

Examples of the capsule wall material include polyurethane, polyurea, polyamide, polyester, polycarbonate, urea-formaldehyde resin, melamine resin, polystyrene, styrene-methacrylate copolymer, styrene-acrylate copolymer and the like. Of these, polyurethane, polyurea, polyamide, polyester and polycarbonate are preferable, and polyurethane and polyurea are more preferable.

A combination of two or more of the above may be used for the polymer material.

Examples of the water-soluble polymer include gelatin, polyvinyl pyrolidone, polyvinyl alcohol and the like.

For example, if polyurethane is used as the capsule wall material, a polyvalent isocyanate and a second material that will react therewith to form the capsule walls (e.g., a polyol or polyamine) are mixed into the water-soluble polymer solution (the aqueous phase) or into the oily medium that is to be encapsulated (the oil phase). The oil phase is emulsified into the aqueous phase, and the polymer-forming reaction at the oil droplet surfaces is initiated by heating. Thus, the microcapsule walls are formed.

Substances disclosed in U.S. Pat. Nos. 3,281,383, 3,773,695, 3,793,268, JP-B 48-40347, JP-B 49-24159, JP-A 48-80191 and JP-A 48-84086 can be used as the polyvalent isocyanate and the polyol or polyamine that reacts therewith.

When the microcapsules are formed, the color-forming component being enclosed may be present inside the capsules in a dissolved state or in a solid state.

If the color-forming component is to be enclosed in the capsules in a dissolved state, the diazonium salt compound that is the color-forming component should be encapsulated after being dissolved in an organic solvent.

The organic solvent can generally be appropriately selected from high-boiling-point solvents. Examples thereof include phosphoric esters, phthalic esters, acrylic esters, methacrylic esters, other carboxylic esters, fatty acid amides, alkylated biphenyls, alkylated terphenyls, chlorinated paraffin, alkylated naphthalene, diallylethane, compounds that are solid at room temperature, oligomer oils, polymer oils and the like.

Specific examples include organic solvents disclosed in JP-A 59-178451-JP-A 59-178455, JP-A 59-178457, JP-A 60-242094, JP-A 63-85633, JP-A 6-194825, JP-A 7-13310, JP-A 7-13311, JP-A 9-106039 and Japanese Patent Application No 62-75409.

A usage amount of the organic solvent is preferably from 1 to 800 parts by weight for 100 parts by weight of the diazo compound, and more preferably from 1 to 600 parts.

Further, so-called oilless capsules, in which the above-described organic solvent is not used, may be used.

If solubility in the organic solvent of the diazo compound to be enclosed is low, the organic solvent can further be combined with a high-solubility low-boiling-point solvent, which serves as an auxiliary solvent.

Alternatively, the low-boiling-point solvent can be used and the organic solvent not used. Examples of the low-boiling-point solvent include ethyl acetate, propyl acetate, isopropyl acetate, butyl acetate, methylene chloride and the like.

The aqueous solution in which the water-soluble polymer is dissolved is used as the aqueous phase for emulsification of the oil phase.

After the oil phase has been introduced into the aqueous phase, emulsification is carried out with a homogenizer or the like. The water-soluble polymer is included to serve as a protection colloid for enabling easy, homogeneous dispersion, and also to serve as a dispersant for stabilizing the emulsified aqueous solution.

Here, a surfactant can be added to one or both of the oil phase and the aqueous phase in order to further homogenize and stabilize the emulsion.

The water-soluble polymer that is included to serve as the protection colloid can be selected from known anionic polymers, nonionic polymers, and amphoteric polymers.

The water-soluble polymer can be used as an aqueous solution of 0.01 to 10% by weight.

As an anionic polymer, any of natural polymers and synthetic polymers can be used. For example, anionic polymers having a linkage group such as —COO—, or —SO$_2$— can be presented.

Specifically, natural products such as gum arabic, alginic acid, pectin and the like; semi-synthetic products such as gelatin derivatives such as carboxymethyl cellulose and phthalated gelatin, sulfated starch, sulfated cellulose, and lignin sulfonnic acid and the like; and synthetic products such as maleic anhydride-based copolymers (including hydrolyzed products), acrylic acid-based (and methacrylic acid-based) polymers and copolymers, vinylbenzene-sulfonic acid-based polymers and copolymers, carboxy-denatured polyvinyl alcohol and the like can be presented.

As a nonionic polymer, polyvinyl alcohol, hydroxyethyl cellulose, methyl cellulose and the like can be presented.

As an amphoteric polymer, gelatin and the like can be presented.

Among the above-mentioned water-soluble polymers, gelatin, gelatin derivatives, and polyvinyl alcohol are preferable.

The surfactant can be appropriately selected from among known emulsification surfactants. For example, the surfactant can be appropriately selected from anionic and nonionic surfactants such that cohesion or precipitation of the surfactant will not be caused by an effect of the above-described protection colloid.

Specific examples include sodium alkylbenzenesulfonate, sodium alkylsulfate, dioctyl sodium sulfosuccinate, poly-alkylene glycol (e.g., polyoxyethylene nonyl phenyl ether) and the like.

An addition amount of the surfactant is preferably 0.1 to 5% by weight relative to the mass of the oil phase, and more preferably 0.5 to 2% by weight.

The color-forming component and all other components to be included, such as the water-soluble polymer, the sensitizer and other color-formation assistants, can be solid-dispersed by means of a sand mill or the like. However, it is preferable to use emulsion: first dissolving these components in a high-boiling-point organic solvent that is insoluble or hard to dissolve in water, then mixing this solution with a polymer aqueous solution (the aqueous phase) that contains the surfactant and/or the water-soluble polymer that serves as the protective colloid, and emulsifying with a homogenizer or the like. In this case, a low-boiling-point solvent may be used as a dissolution assistant.

Further, the color-forming component and all the other components to be included can be respectively separately emulsified, or can be mixed beforehand, dissolved in the high-boiling-point solvent and/or low-boiling-point solvent, and emulsified.

The size of emulsion particles formed by emulsification is desirably not more than 1 μm.

Emulsification of the oil phase containing the components and the aqueous phase containing the surfactant and/or protective colloid can be performed easily using a technique of microparticle emulsification such as high-speed stirring, ultrasonic wave dispersion or the like. A known emulsification device can be used; for example, a homogenizer, a Manton Gaulin, an ultrasonic disperser, a dissolver, a KADY mill or the like.

After emulsification, in order to accelerate the capsule wall-forming reaction, the emulsion is heated to between 30 and 70° C. Further, in order to prevent the capsules cohering together during the reaction, addition of water to reduce the number of collisions between the capsules, thorough stirring and the like may be required.

It is also possible to add a separate, cohesion-prevention dispersion during the reaction.

Emissions of carbonic acid gas can be observed accompanying progress of a polymerization reaction. Thus, for the capsule wall-forming reaction, when such emissions finish, it can be seen that the reaction has finished.

Usually, microcapsules enclosing the color-forming component can be obtained by performing this reaction for a period of several hours.

In the present invention, the microcapsule average particle size is preferably 20 μm or less, and further preferably 5 μm or less, from the viewpoint of obtaining high resolution.

Further, if the size of the formed microcapsules is too small, specific surface area with respect to a unit of solid components becomes large such that a large amount of the wall agent is required. Thus, the average particle size is preferably 0.1 μm or more.

In the recording material of the present invention, for promotion of the coupling reaction, it is preferable to use an organic base, such as a tertiary amine, a piperidine, a piperazine, an amidine, a formamidine, a pyridine, a guanidine, a morpholine, or the like.

Specific examples of the organic base include piperazines such as N,N'-bis(3-phenoxy-2-hydroxypropyl)piperazine, an N,N'-bis[3-(p-methylphenoxy)-2-hydroxypropyl]piperazine, N,N'-bis[3-(p-methoxyphenoxy)-2-hydroxypropyl]piperazine, N,N'-bis(3-phenylthio-2-hydroxypropyl)piperazine, N,N'-bis[3-(β-naphthoxy)-2-hydroxypropyl]piperazine, N-3-(β-naphthoxy)-2-hydroxypropyl-N'-methylpiperazine, 1,4-bis{[3-(N- methylpiperazino)-2-hydroxy]propyloxy}benzene and the like; morpholines such N-[3-(β-naphthoxy)-2-hydroxy]propylmorpholine, 1,4-bis[(3-morpholino-2-hydroxy)propyloxy]benzene, 1,3-bis[(3-morpholino-2-hydroxy)propyloxy]benzene] and the like; piperidines such as N-(3-phenoxy-2-hydroxypropyl)piperidine, N-dodecylpiperidine and the like; triphenylguanidine; tricyclohexylguanidine; dicyclohexylphenylguanidine; 2-N-methyl-N-benzylaminoethyl 4-hydroxybenzoate; 2-N,N-di-n-butylaminoethyl 4-hydroxybenzoate; 4-(3-N,N-dibutylaminopropoxy)benzenesulfonamide; 4-(2-N,N-dibutylaminoethoxycarbonyl)phenoxyacetic acid amide and the like.

Details thereof are disclosed in JP-A Nos. 57-123086, 60-49991, 60-94381, 9-71048, 9-77729, and 9-77737, and the like.

Moreover, the compounds presented as specific examples of organic bases (B-1) to (B-38) in the explanation for the azo colorant forming reaction method can also be used preferably as a component of the recording layer.

These organic bases can be used alone or in a combination of two or more. An amount of the organic base used in the present invention is not particularly limited but usage in a range of 1 to 30 moles for 1 mole of the diazo compound is preferable.

In the recording material of the present invention, in order to promote the coupling reaction, it is preferable to add a reducing agent, such as an aminophenol, a phenol, a catechol, a hydroquinone, an amine, a hydroxyamine, an alcohol, a thiol, a sulfide, an alkaline metal, an alkaline earth metal, a metal hydride, a hydrazine, a phenidone, an aniline, a phenyl ether, or an L-ascorbic acid. Among these examples, hydroquinones, catechols, and aminophenols are preferable. As non-limiting specific examples of the reducing agent, the above-mentioned compounds (R-1) to (R-78) can be presented.

These reducing agents can be used as a fine particle-state solid dispersion in the recording layer, as an emulsion dissolved alone in an oil, or added to the oil phase of the coupler emulsion. Moreover, in cases where the diazo compound or the coupler is provided in microcapsules, the reducing agent can be added inside the microcapsules, or added both inside and outside the microcapsules.

Furthermore, a content amount of the above-mentioned reducing agent is preferably 1 to 10 by mole ratio compared to the diazo compound, and more preferably 1 to 4 by mole ratio. With a diazo compound content amount less than 1 by mole ratio compared to the diazo compound, a color-developing property-improving effect and an image storability-improving effect may not be obtained sufficiently. In contrast, with an amount more than 10 by mole ratio, the color-developing property-improving effect may be reduced and the raw storability may deteriorate.

Moreover, in the present invention, in order to promote the color-developing reaction, a color-developing auxiliary agent can be added.

The color-developing auxiliary agent can be a phenol derivative, a naphthol derivative, an alkoxy-substituted benzene, an alkoxy-substituted naphthalene, a hydroxy compound, a carboxylic acid amide compound, a sulfonamide compound, or the like.

These compounds are thought to improve the color-developing property and the color-developing density by lowering the melting point of the coupler compound or the base, or by improving heat transmissivity of the capsule walls.

The components other than the coupler and the diazo compound, such as the organic base, the reducing agent, the color-developing auxiliary agent and the like, can be used, similarly to the coupler, as an emulsion with an appropriate emulsification auxiliary agent, or as a solid dispersion dispersed by a sand mill or the like. At this time, the emulsification or solid dispersion may be executed simultaneously with dispersion of the coupler, or the emulsification or solid dispersion may be executed separately from dispersion of the coupler.

In the recording material of the present invention, it is preferable to use a binder in the recording layer, for fixing various materials such as the color-developing components and the like on the support, or on an already-coated recording layer or intermediate layer.

The binder to be used in the recording layer is not particularly limited. For example, any one can be suitably selected from known binders or various emulsions or the like, such as gelatin, polyvinyl alcohol, methyl cellulose, carboxymethyl cellulose, hydroxypropyl cellulose, gum arabic, polyvinyl pyrolidone, casein, a styrene-butadiene latex, an acrylonitrile-butadiene latex, polyvinyl acetate, polyacrylate ester, an ethylene-vinyl acetate copolymer, hydroxyethyl cellulose, a styrene-acrylic acid copolymer and the like.

Details are disclosed in JP-A No. 2-141279 and the like.

An amount of the binder is preferably 0.5 to 5 g/m$^2$ calculated for solid components.

In the recording material of the present invention, in addition to the above-mentioned materials, as an acid stabilizing agent, citric acid, tartaric acid, oxalic acid, boric acid, phosphoric acid, pyrophosphoric acid, or the like can be used.

In addition thereto, as needed, various kinds of organic or inorganic pigments, various kinds of stabilizing agents, antioxidants and the like can also be added.

A heat-sensitive recording material of the present invention can be produced by preparing a coating liquid containing the diazonium salt compound, the coupler compound, the base and other additives, and coating the same onto a desired support.

The coating method for the coating liquid can be suitably selected from known coating methods, such as bar coating, blade coating, air knife coating, gravure coating, roll coating, spray coating, dip coating, curtain coating or the like.

A coating amount is determined such that a 2 to 30 g/m$^2$ recording layer, by solid component weight, is provided after coating and drying.

In the recording material of the present invention, the configuration of the recording layer is not particularly limited. Components such as the diazo compound, the coupler, the base and the like can be contained in the same recording layer, or a laminated configuration with the components contained in different layers can be adopted.

The support to be used in the recording material of the present invention is not particularly limited as long as it satisfies desired physical properties such as strength, durability, smoothness and the like. The support can be suitably selected form known supports. Examples include neutral paper, acidic paper, recycled paper, polyolefin resin-laminated paper, synthetic paper, polyester film, cellulose derivative films such as cellulose triacetate film and the like, a polystyrene film, polyolefin films such as polypropylene film, polyethylene film and the like. These can be used alone or laminated.

The thickness of the support is preferably 20 to 200 μm. Moreover, a base coating layer or a back layer can be provided on the support.

Furthermore, it is also possible to provide an intermediate layer between the support and the recording layer. Details are disclosed in JP-A No. 61-54980 and the like.

In the recording material of the present invention, in addition to the recording layer, as needed, other layers can be provided on the support.

For example, a protection layer can be provided on the recording layer, as one layer or as a plurality of laminated layers.

The protection layer is made of a water-soluble polymer compound, a pigment and the like.

Moreover, in the protection layer, in view of achieving both light resistance and a light-fixing property, it is preferable to include a compound having an ultraviolet ray transmissivity ratio-adjusting function. A heat-sensitive recording material containing a compound having an ultraviolet ray transmissivity ratio-adjusting function is disclosed in detail in JP-A No. 7-276808.

The recording material of the present invention can be provided as a multi-color recording material.

Multi-color recording materials are disclosed in JP-A Nos. 4-135787, 4-144784, 4-144785, 4-194842, 4-247447, 4-247448, 4-340540, 4-340541, 5-34860 and the like.

Specifically, the multi-color recording materials can be obtained by laminating a plurality of single-color recording layers that develop colors with different hues onto the support. Hereafter, the case of using the recording material of the present invention for a multi-color heat-sensitive recording material will be described specifically. The recording material of the present invention can be applied to any material having recording layers each containing a diazo compound and a coupler.

The recording layer configuration of the multi-color heat-sensitive recording material is not particularly limited. One example thereof is a multi-color heat sensitive recording material in which layer B containing a first diazonium salt compound having a first photosensitive wavelength and a first coupler compound which reacts with the first diazonium salt compound when heated to develop first color, the layer C containing a second diazonium salt compound having a second photosensitive wavelength and a second coupler compound which reacts with the second diazonium salt compound when heated to develop second color, and the layer A containing a combination of an electron-donating colorless dye and an electron-accepting compound are provided on a support.

Specifically, onto a support, a first heat-sensitive recording layer (layer A) containing an electron-donating colorless dye and an electron-accepting compound, a second heat-sensitive recording layer (layer B) containing a diazonium salt compound with a 360 nm±20 nm maximum absorption wavelength and a coupler which reacts with the diazonium salt compound when heated to develop color, and a third heat-sensitive layer (layer C) containing a diazonium salt compound with a 400 nm±20 nm maximum absorption wavelength and a coupler which reacts with the diazonium salt compound when heated to develop color are laminated in that order. In this recording material, diazonium salts in layer B and layer C and the electron-donating colorless dye or the electron-accepting compound are respectively provided in microcapsules. Moreover, the temperature at which the microcapsules in layer A let substances pass is higher than the temperature at which the microcapsules in layer B let substances pass and the temperature at which the microcapsules in layer B let substances pass is higher than the temperature at which the microcapsules in layer C let substances pass. In this case, by selecting the three primary colors, yellow, magenta, and cyan, of subtractive process as the color-developing hues of the heat-sensitive recording layers, full-color image recording can be enabled.

In a method for multi-color recording, firstly, the third heat-sensitive recording layer (layer C) is heated, and the diazonium salt compound and coupler in layer C develop color. Then, light with a wavelength of 400±20 nm is irradiated, and unreacted diazonium salt compound contained in layer C is decomposed and light-fixed. Next, sufficient heat to cause color-developing in the second heat-sensitive recording layer (layer B) is applied, and the diazonium salt compound and coupler in layer B develop color. At this time, layer C is also being heated strongly, but the diazonium salt compound therein has already been decomposed (light-fixed). Thus, layer C has lost any color-developing ability and does not develop color at this time. Then, light with a wavelength of 360±20 nm is irradiated, and unreacted diazonium salt compound contained in layer B is decomposed and light-fixed. Finally, sufficient heat to cause color-developing in the first heat-sensitive recording layer (layer A) is applied, and color is developed therein. At this time, layers B and C are also being heated strongly, but the diazonium salt compounds therein have already been decomposed (light-fixed). Thus, layers B and C have lost any color-developing ability and do not develop color at this time.

Moreover, it is also possible to provide three heat-sensitive recording layers (layers A, B and C in that order from the support) each containing a different diazonium salt compound with a different heat-sensitive wavelength in combination with a coupler which reacts with the diazonium salt compound when heated so as to develop a different hue.

The lamination order of the layers is such that a yellow layer, which has low visibility, is the lowest layer. Consequently, an effect of roughness of the support on image quality can be reduced. This is particularly worthwhile if an improvement in image quality is to be achieved.

Also, if all of the heat-sensitive recording layers (layers A, B and C) contain diazo compounds, although light-fixing must be performed after color formation for layers B and C, light-fixing is not necessarily required for the last layer to undergo image-recording, layer A. However, with regard to improving preservation stability of a formed image, it is preferable to perform light-fixing for layer A.

A fixing light source for light-fixing can be suitably selected from known light sources. Examples thereof include various fluorescent lamps, xenon lamps, mercury lamps and the like. Of these, in view of high efficiency of light-fixing, it is preferable to use a light source whose emission spectrum strongly matches the absorption spectrum of the diazonium salt compound used in the heat-sensitive recording material.

Moreover, the heat-sensitive recording material of the present invention can be used as a heat-development-type photosensitive material. First, light-exposure is performed through an original positioned over the heat-sensitive recording layer of the heat-sensitive recording material, to decompose the diazonium salt compound at the non-image portion and to form a latent image. Then, the whole of the heat-sensitive recording material is heated and an image is formed.

EXAMPLES

Hereinafter Examples of the present invention will be described, but the present invention is not limited thereto.

Example 1

Measurement of the Coupling Rate

With a coupler (above-mentioned compound (C-1)) a diazo compound (aforementioned compound (D-1)), and a base (TGP: triphenylguanidine, aforementioned compound (B-1)) of the present invention, a coupling reaction constant was calculated as follows. Results are shown in table 1.

Yield was calculated from a mole light absorption coefficient ($\epsilon$) of a separately synthesized colorant relative to the absorbance of the produced colorant.

Equivalent amounts of an ethyl acetate solution containing an $8 \times 10^{-5}$ mole concentration of the diazo compound and an ethyl acetate solution containing an $8 \times 10^{-3}$ mole concentration of each of the coupler and the base were mixed by a stopped flow measurement device (produced by Otsuka Electronics Co., Ltd., product name: RA-401). Change with time of the absorbance of the produced colorant was measured. The coupling rate constant was calculated from the following formula (1).

$$d[\text{colorant}]/dt = k[\text{diazo compound}] \quad \text{formula (1)}$$

In formula (1), k denotes the coupling rate constant (/s), t denotes time (s), [colorant] denotes the produced mole amount (mol) of the colorant, and [diazo compound] denotes the initial diazo compound mole amount (mol).

Examples 2 to 14

Comparative Examples 1 to 7

The azo coupling reaction was performed as in Example 1, with combinations of couplers, diazo compounds and bases as shown in table 1 below, and coupling rate constants were calculated in the same manner as for Example 1. Results are shown in table 1. Among the couplers in table 1, the couplers (C-1') to (C-34') used in the Comparative Examples are couplers having the same coupler mother core as in compounds (C-1) to (C-34) but with a hydrogen atom provided at the coupling position.

From the results shown in the table 1, it is observed that the reaction rate was improved and the yield was made better by using a coupler having a leaving group in accordance with the present invention, as compared with the case of using a coupler having the same mother core, regardless of whether or not a reducing agent was used and which solvent was used.

Example 15

Recording Material

Hereinafter, Examples of the recording material of the present invention will be explained. In Examples, "part" denotes "part by weight", and "%" denotes "% by weight".

[Preparation of a Diazonium Salt Compound-containing Microcapsule Liquid]

2.8 parts of a diazonium salt compound (above-mentioned diazo compound (D-2), maximum absorption wavelength: 370 nm) and 12 parts of tricresyl phosphate were added to 11 parts of ethyl acetate and mixed homogeneously. Then, 10.2 parts of TAKENATE D-110N (produced by Takeda Chemical Industries Ltd.) was added to this liquid mixture to serve as a capsule wall agent, and mixed homogeneously for obtaining a liquid I.

Next, 92 parts of a 6% aqueous solution of phthalated gelatin and 2 parts of a 10% aqueous solution of a sodium dodecylbenzenesulfonate were added to the liquid I and emulsified by a homogenizer at 40° C. 10 parts of water was added to the obtained emulsion and homogenized therewith. A microcapsulation reaction was performed for 3 hours at 40° C. while the liquid was stirred so as to obtain a diazonium salt compound-containing microcapsule liquid. The average particle size of the obtained microcapsules was 0.4 to 0.6 µm. Then, the concentration of the microcapsule liquid was adjusted to a 23% solid component concentration.

TABLE 1

| | Coupler | Diazonium Salt | Base | Reducing Agent | Solvent | $K(s^{-1})$ | Yield (%) |
|---|---|---|---|---|---|---|---|
| Example 1 | C-1 | D-1 | B-1 | None | Ethyl Acetate | 0.34 | 85 |
| Example 2 | C-2 | D-1 | B-1 | None | Butyl Acetate | 0.64 | 90 |
| Example 3 | C-5 | D-1 | B-1 | R-1 | Ethyl Acetate | 0.14 | 75 |
| Example 4 | C-11 | D-1 | B-1 | R-1 | Ethyl Acetate | 0.2 | 90 |
| Example 5 | C-12 | D-1 | B-1 | None | Ethyl Acetate | 0.33 | 85 |
| Example 6 | C-15 | D-1 | B-1 | None | Methanol | 6.0 | 80 |
| Example 7 | C-18 | D-1 | B-1 | None | Ethyl Acetate | 0.16 | 75 |
| Example 8 | C-34 | D-1 | B-1 | None | Ethyl Acetate | 19.65 | 98 |
| Example 9 | C-1 | D-2 | B-1 | None | Ethyl Acetate | 0.45 | 88 |
| Example 10 | C-1 | D-3 | B-1 | None | Butyl Acetate | 0.40 | 68 |
| Example 11 | C-1 | D-2 | B-2 | None | Butyl Acetate | 0.15 | 75 |
| Example 12 | C-1 | D-2 | B-7 | None | Ethanol | 0.65 | 88 |
| Example 13 | C-1 | D-2 | B-1 | R-1 | Ethyl Acetate | 1.05 | 91 |
| Example 14 | C-1 | D-2 | B-1 | R-10 | Ethyl Acetate | 1.25 | 95 |
| Comparative Example 1 | C-1' | D-1 | B-1 | None | Ethyl Acetate | 0.012 | 60 |
| Comparative Example 2 | C-11' | D-1 | B-1 | None | Ethyl Acetate | 0.006 | 55 |
| Comparative Example 3 | C-12' | D-1 | B-1 | None | Ethyl Acetate | 0.010 | 58 |
| Comparative Example 4 | C-15' | D-1 | B-1 | None | Methanol | 0.20 | 62 |
| Comparative Example 5 | C-18' | D-1 | B-1 | None | Ethyl Acetate | 0.008 | 50 |
| Comparative Example 6 | C-34' | D-1 | B-1 | None | Ethyl Acetate | 4.60 | 80 |
| Comparative Example 7 | C-1' | D-1 | B-1 | R-1 | Ethyl Acetate | 0.008 | 52 |

[Preparation of a Coupler Compound Emulsion]

2.9 parts of a coupler compound (above-mentioned coupler (C-1)), an amount of 1 by mole ratio with respect to the content of the coupler compound (C-1) of a reducing agent (above-mentioned reducing agent (R-10)), 3.3 parts of triphenylguanidine to serve as a base, 2.2 parts of tricresyl phosphate, 2.0 parts of 4,4'-(p-phenylene diisopropylidene) diphenol, and 1.0 part of BIONINE A41C (produced by Takemoto Oil & Fat Co., Ltd.) were dissolved in 24.0 parts of ethyl acetate to obtain a liquid II.

Then, the liquid II was added to 57 parts of an 8% aqueous solution of lime-processed gelatin at 40° C., and emulsified for 10 minutes at 40° C. by a homogenizer.

After stirring the obtained emulsion for a further 2 hours at 40° C. and eliminating the ethyl acetate, water was added to the emulsion to obtain a 20% solid component concentration of the coupler compound emulsion. Thus, a cyan color-developable coupler compound emulsion was obtained.

[Preparation of a Heat-sensitive Recording Layer Coating Liquid]

3.6 parts of the diazonium salt compound-containing microcapsule liquid, 2.2 parts of water, and 10.0 parts of the coupler compound emulsion were mixed homogeneously to obtain a heat-sensitive recording layer coating liquid.

[Preparation of a Protection Layer Coating Liquid]

15 parts of a 40% dispersion liquid of zinc stearate (product name: HYDRIN Z, produced by Chukyo Yushi Corp.) was mixed homogeneously with a liquid mixture of 100 parts of a 6% aqueous solution of itaconic acid-denatured polyvinyl alcohol (product name: KL-318, produced by Kuraray Co., Ltd.) and 10 parts of a 30% dispersion liquid of epoxy-denatured polyamide (product name: FL-71, produced by Toho Kagaku Corp.) to obtain a protection layer coating liquid.

[Preparation of a Heat-sensitive Recording Layer]

The heat-sensitive recording layer coating liquid was applied to a printing paper support comprising wood-free paper and polyethylene by wire bar so as to have a 6.7 g/m² solid component coating amount, and dried (50° C.). Then, the protection layer coating liquid was coated by wire bar so as to have a 1.2 g/m² solid component coating amount, and dried (50° C.) Thus, a heat-sensitive recording material (1) of the present invention was produced as Example 15.

Color Development Test

With the obtained heat-sensitive recording material (1), thermal printing was executed by a KST type thermal head (produced by Kyocera Corp.) with applied electric power and pulse width at the thermal head determined so as to provide a recording energy per unit area of 50 mJ/mm². 6 seconds after the printing operation, the entire surface was subjected to light irradiation for 20 seconds with an ultraviolet ray lamp having a light emission central wavelength of 365 nm and 40 W output.

Densities of an image portion and a base portion (non-image portion), at which the heat energy was not applied of the heat-sensitive recording material (1) were measured with a Macbeth density meter (produced by Macbeth Corp.). The measurement results are shown in table 2.

Example 16

A heat-sensitive recording material was produced in the same manner as in Example 15 except that 1.9 parts of a coupler compound (above-mentioned compound (C-17)) was used instead of the 2.9 parts of the coupler (C-1). The obtained heat-sensitive recording material was evaluated in the same manner as in Example 15. Results are shown in table 2.

Example 17

A heat-sensitive recording material was produced in the same manner as in Example 15 except that 2.6 parts of a coupler compound (above-mentioned compound (C-34)) was used instead of the 2.9 parts of the coupler (C-1). The obtained heat-sensitive recording material was evaluated in the same manner as in Example 15. Results are shown in table 2.

Example 18

A heat-sensitive recording material was produced in the same manner as in Example 15 except that 2.6 parts of a coupler compound (above-mentioned compound (C-2)) was used instead of the 2.9 parts of the coupler (C-1). The obtained heat-sensitive recording material was evaluated in the same manner as in Example 15. Results are shown in table 2.

Examples 19 to 22

Heat-sensitive recording materials were produced in the same manner as in Examples 15 to 18 except that a diazo compound (above-mentioned compound (D-1)) was used instead of the diazo compound (D-2). The obtained heat-sensitive recording materials were evaluated in the same manner as in Example 15. Results are shown in table 2.

Example 23

A heat-sensitive recording material was produced in the same manner as in Example 15 except that 2.6 parts of a coupler compound (above-mentioned compound (C-15)) was used instead of the 2.9 parts of the coupler (C-1). The obtained heat-sensitive recording material was evaluated in the same manner as in Example 15. Results are shown in table 2.

Comparative Examples 8 to 16

Heat-sensitive recording materials were produced in the same manner as in Examples 15 to 23 except that couplers (C'-1), (C'-17), (C'-34), (C'-2) and (C'-15), respectively having the same coupler mother core but with a hydrogen atom provided at the coupling position, were used instead of the couplers (C-1), (C-17), (C-34), (C-2) and (C-15). The obtained heat-sensitive recording materials were evaluated in the same manner as in Example 15. Results are shown in table 2.

TABLE 2

|  | Coupler | Diazo Compound | Developed Color Hue | Developed Color Density | Base Density |
|---|---|---|---|---|---|
| Example 15 | C-1 | D-2 | Cyan | 1.60 | 0.07 |
| Example 16 | C-17 | D-2 | Cyan | 1.50 | 0.07 |
| Example 17 | C-34 | D-2 | Magenta | 1.75 | 0.06 |
| Example 18 | C-2 | D-2 | Cyan | 1.62 | 0.07 |
| Example 19 | C-1 | D-1 | Cyan | 1.70 | 0.06 |
| Example 20 | C-17 | D-1 | Cyan | 1.58 | 0.07 |
| Example 21 | C-34 | D-1 | Magenta | 1.78 | 0.06 |
| Example 22 | C-2 | D-1 | Cyan | 1.65 | 0.07 |
| Example 23 | C-15 | D-2 | Cyan | 1.70 | 0.15 |

TABLE 2-continued

|  | Coupler | Diazo Compound | Developed Color Hue | Developed Color Density | Base Density |
|---|---|---|---|---|---|
| Comparative Example 8 | C-1' | D-2 | Cyan | 0.80 | 0.06 |
| Comparative Example 9 | C-17' | D-2 | Cyan | 0.70 | 0.06 |
| Comparative Example 10 | C-34' | D-2 | Magenta | 0.62 | 0.07 |
| Comparative Example 11 | C-2' | D-2 | Cyan | 0.75 | 0.07 |
| Comparative Example 12 | C-1' | D-1 | Cyan | 0.78 | 0.06 |
| Comparative Example 13 | C-17' | D-1 | Cyan | 0.45 | 0.07 |
| Comparative Example 14 | C-34' | D-1 | Magenta | 0.58 | 0.06 |
| Comparative Example 15 | C-2' | D-1 | Cyan | 0.62 | 0.07 |
| Comparative Example 16 | C-15' | D-2 | Cyan | 1.55 | 0.13 |

As is apparent from table 2, it can be seen that a recording material using a coupler having a leaving group has a superior color-developing property in an image portion compared with a case of a recording material using a coupler with the same mother core but not having the leaving group.

Moreover, the recording material of the present invention can be utilized not only as the above-mentioned heat-sensitive recording material but also as a copying material. Hereafter, an example of applying the recording material of the present invention in a copying material will be presented.

Example 24

Preparation of a Microcapsule Liquid 2 parts of a diazo compound (the above-mentioned compound (D-6)), 1 part of a compound represented by formula (6) below, and 1 part of a compound represented by formula (7) below were dissolved in 5 parts of ethyl acetate.

Formula 6

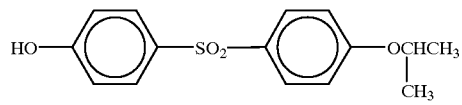

Formula 7

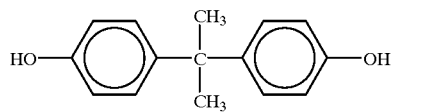

3 parts of an isocyanate having a tolylene diisocyanate (TDI) isocyanurate structure (SUMIDUR FL-2; product of Sumitomo Bayer Urethane Co., Ltd.) and 3 parts of an isocyanate having a xylylene diisocyanate (XDI) trimethylol propane adduct structure of (TAKENATE D-110N; product of Takeda Chemical Industries, Ltd.) were added to the solution of the diazo compound, and stirred and mixed.

An accordingly obtained ethyl acetate solution of the diazo compound, the isocyanate, and the compounds represented by the formulae (6) and (7) was mixed with an aqueous solution of 1 part of polyvinyl alcohol (produced by Kuraray Co., Ltd.; PVA217E) dissolved in 10 parts of water, and thix mixture was emulsified to obtain an emulsion with a 1.0 $\mu$m average particle size. 10 parts of water was added to the obtained emulsion, which was then heated to 40° C. while being stirred. The isocyanate, a wall-forming substance, reacted for 3 hours. Microcapsules with a 1 $\mu$m average particle size and containing the diazo compound and the compounds represented by the formulae (6) and (7) as core substances were obtained.

The above-described capsulation reaction was executed under a reduced pressure of 400 mmHg to 500 mmHg caused by a water flow pump.

Preparation of a Coupler Dispersion Liquid 5 parts of a coupler (above-mentioned compound (C-1)) and 5 parts of a base, triphenylguanidine (B-1), were added to 100 parts of a 5% by weight aqueous solution of polyvinyl alcohol, and dispersed for 24 hours by a sand mill. A dispersion liquid with a 2 $\mu$m average particle size was obtained.

<Preparation of a Coating Liquid>

A coating liquid was prepared by adding 25 parts of the coupler dispersion liquid, 10 parts of a 40% by weight dispersion liquid of calcium carbonate (produced by Shiraishi Kogyo Corp.: UNIVER 70), 5 parts of a 20% by weight dispersion liquid of stearatic acid amide, 2 parts of a 40% by weight dispersion liquid of zinc 3,5-di-$\alpha$-methylbenzylsalicylate, and 1 part of a 5% by weight liquid of L-ascorbic acid (produced by Takeda Chemical Industries, Ltd.: Vitamin C) to 10 parts of the diazo compound capsule liquid obtained as mentioned above.

Production of a Copying Material

The above-mentioned coating liquid was bar-coated with a coating bar onto smooth wood-free paper (76 g/m$^2$) at 5 g/m$^2$ dry weight (0.2 g/m$^2$ for the diazo compound, and 0.02 g/m$^2$ for the L-A ascorbic acid), and dried at 50° C. for 3 minutes. Thus, a copying material of the present invention was obtained.

[Evaluation of Heat Sensitivity]

A heat block heated to 100° C. after imagewise exposure was pressed against the copying material for 2.5 seconds to form an image. Density of an image portion was measured with a Macbeth density meter. Results are shown in table 3.

[Evaluation of Storability]

For evaluation of the storability (raw storability) of the obtained copying material, a forcible deterioration test of leaving the copying material for one day in a dark-place atmosphere with 90% relative humidity (90% RH) at 40° C., and in a dark-place atmosphere with 30% relative humidity (30% RH) at 60° C. was executed. Base density was measured with a Macbeth density meter before and after each test. Results are shown in table 3.

Example 25

A coating liquid was prepared in the same manner as in Example 24 except that a coupler (above-mentioned coupler (C-2)) was used instead of the coupler (C-1) used in Example 24, and a copying material was produced. The heat sensitivity and storability were evaluated.

Example 26

A coating liquid was prepared in the same manner as in Example 24 except that a coupler (above-mentioned coupler (C-15)) was used instead of the coupler (C-1) used in Example 24, and a copying material was produced. The heat sensitivity and storability were evaluated.

Example 27

A coating liquid was prepared in the same manner as in Example 24 except that 0.5 parts of a reducing agent (R-6)

was added to the coupler (C-1), and a copying material was produced. The heat sensitivity and storability were evaluated.

Comparative Example 17

A coating liquid was prepared in the same manner as in Example 24 except that a coupler (C-1') having the same coupler mother core but with a hydrogen atom provided at the releasing position was used instead of the coupler (C-1), and a copying material was produced. The heat sensitivity and storability were evaluated.

TABLE 3

| | Color Developing Density | Evaluation | Base Portion Density | | |
|---|---|---|---|---|---|
| | | | Before Storage | After One Day 40° C., 90% RH | After One Day 60° C., 30% RH |
| Color Developed Portion | | | | | |
| Example 24 | 1.60 | O | 0.08 | 0.10 | 0.15 |
| Example 25 | 1.50 | O | 0.08 | 0.12 | 0.14 |
| Example 26 | 1.77 | O | 0.09 | 0.12 | 0.15 |
| Example 27 | 1.85 | O | 0.08 | 0.09 | 0.13 |
| Comparative Example 17 | 1.25 | x | 0.10 | 0.10 | 0.15 |

From the results of table 3, it was learned that the recording material of the present invention, applied in a copying material, provides excellent stability and color-developing density. Moreover, it was observed that quick color development was carried out by heating after image exposure.

What is claimed is:

1. A method for forming an azo colorant, wherein a coupler having a leaving group at a coupling position thereof and a diazo compound pound are used, and the method has a faster coupling reaction rate constant, measured by mixing equivalent amounts of an ethyl acetate solution containing an $8 \times 10^{-5}$ mole concentration of the diazo compound and an ethyl acetate solution containing an $8 \times 10^{-3}$ mole concentration of the coupler and a base with a stopped flow measurement device and by measuring change over time of an absorbance of the produced colorant and applying the resultant value to the following formula (1), than an azo dye-forming reaction between the diazo compound and a coupler having a hydrogen atom at a coupling position thereof:

$$D\{\text{colorant}\}/dt = k\{\text{diazo compound}\} \quad \text{formula (1)}$$

wherein k diotes the coupling reaction rate constant (s$^{-1}$), t denotes time (s), {colorant} denotes a mole amount of the produced colorant, and {diazo compound} denotes an initial mole amount of the diazo compound (mol).

2. A method for forming an azo colorant, wherein a coupler having a leaving group at a coupling position thereof and a diazo compound are used, and the method has a coupling reaction rate constant k, measured by mixing equivalent amounts of an ethyl acetate solution containing an $8 \times 10^{-5}$ mole concentration of the diazo compound and an ethyl acetate solution containing an $8 \times 10^{-3}$ mole concentration of the coupler and a base with a stopped flow measurement device and by measuring change over time of an absorbance of the produced colorant and applying the resultant value to the following formula (1), of at least 0.1 s$^{-1}$:

$$D\{\text{colorant}\}/dt = k\{\text{diazo compound}\} \quad \text{formula (1)}$$

wherein k denotes the coupling reaction rate constant (s$^{-1}$), t denotes time (s), {colorant} denotes a mole amount of the produced colorant, and {diazo compound} denotes an initial mole amount of the diazo compound (mol).

3. The method for forming an azo colorant according to claim 1, wherein the coupler has a structure represented by one of the following general formulae (1), (2), (3), (4), and (5):

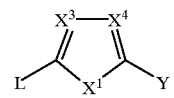

(1)

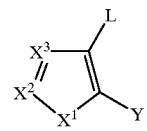

(2)

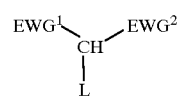

(3)

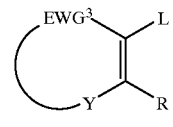

(4)

$$Z—Ar—L \quad (5)$$

in which $X^1$, $X^2$, $X^3$, and $X^4$ each independently represent an atomic group necessary for forming a five-membered aromatic heteroring; Y represents one of a hydroxyl group, an amino group which may have a substituent, an alkyl group which may have a substituent, an aryl group which may have a substituent, an alkoxy group which may have a substituent, and an aryloxy group which may have a substituent; R represents one of a hydroxyl group, an alkyl group which may have a substituent, an aryl group which may have a substituent, an alkoxy group which may have a substituent, an aryloxy group which may have a substituent, an amino group which may have a substituent, an alkylthio group which may have a substituent, and an arylthio group which may have a substituent; Z represents one of a hydroxyl group and an amino group which may have a substituent; Ar represents a benzene ring, naphthalene ring, pyridine ring or quinoline ring, each of which may have a substituent; L represents a substituent that is releasable at a time of coupling with the diazo compound; EWG$^1$, EWG$^2$ and EWG$^3$ each independently represents an electron-attractive group; and X$^1$ and Y, EWG$^1$ and EWG$^2$, and Y and R may each link with each other to form a ring.

4. The method for forming an azo colorant according to claim 3, wherein the diazo compound is a compound represented by one of the following general formulae (6), (7), and (8):

(6)

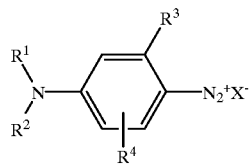

(7)

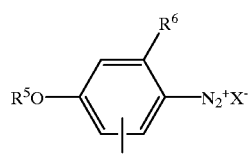

(8)

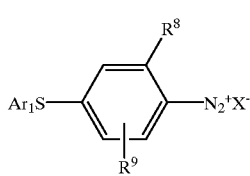

in which, in general formulae (6) and (7), $R^1$ and R2 each represent one of a hydrogen atom and an alkyl group which may have a substituent; $R^1$ and $R^2$ may link with each other to form a heterocycle; $R^1$ and $R^2$ cannot both be hydrogen atoms; $R^3$ represents one of an alkyl group which may have a substituent, an alkoxy group which may have a substituent, an aryloxy group which may have a substituent, an alkylthio group which may have a substituent, an arylthio group which may have a substituent, an alkylsulfonyl group which may have a substituent, and an arylsulfonyl group which may have a substituent; $R^4$ represents one of a hydrogen atom, an alkyl group which may have a substituent, and an alkoxy group which may have a substituent; $R^5$ represents one of a hydrogen atom and an alkyl group which may have a substituent; $R^6$ and $R^7$ each represent one of an alkyl group which may have a substituent, an alkoxy group which may have a substituent, an aryloxy group which may have a substituent, an alkylthio group which may have a substituent, and an arylthio group which may have a substituent; $R^6$ and $R^7$ may be the same or different from each other; and $X^-$ represents an acid anion, and in the general formula (8), $Ar^1$ represents an aryl group which may have a substituent; $R^8$ and $R^9$ each represent one of an alkyl group which may have a substituent, an aryl group which may have a substituent, an alkoxy group which may have a substituent, and an aryloxy group which may have a substituent; $R^8$ and $R^9$ may be the same or different from each other; and $X^-$ represents an acid anion.

5. The method for forming an azo colorant according to claim 2, wherein the coupler has a structure represented by one of the following general formulae (1), (2), (3), (4), and (5):

(1)

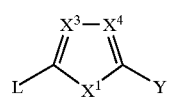

-continued (2)

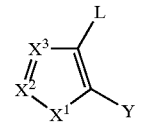

(3)

(4)

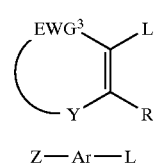

(5)

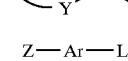

in which $X^1$, $X^2$, $X^3$, and $X^4$ each independently represent an atomic group necessary for forming a five-membered aromatic heterolring; Y represents one of a hydroxyl group, an amino group which may have a substituent, an alkyl group which may have a substituent, an aryl group which may have a substituent, an alkoxy group which may have a substituent, and an aryloxy group which may have a substituent; R represents one of a hydroxyl group, an alkyl group which may have a substituent, an aryl group which may have a substituent, an alkoxy group which may have a substituent, an aryloxy group which may have a substituent, an amino group which may have a substituent, an alkylthio group which may have a substituent, and an arylthio group which may have a substituent; Z represents one of a hydroxyl group and an amino group which may have a substituent; Ar represents a benzene ring, a naphthalene ring, a pyridine ring or a quinoline ring, each of which may have a substituent; L represents a substituent that is releasable at a time of coupling with the diazo compound; $EWG^1$, $EWG^2$ and $EWG^3$ each independently represent an electron-attractive group; and $X^1$ and Y, $EWG^1$ and $EWG^2$, and Y and R may each link with each other to form a ring.

6. The method for forming an azo colorant according to claim 5, wherein the diazo compound is a compound represented by one of the following general formulae (6), (7), and (8):

(6)

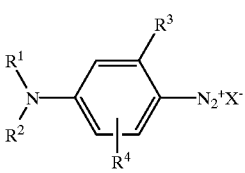

(7)

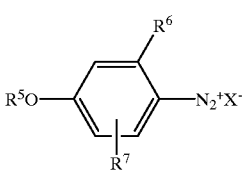

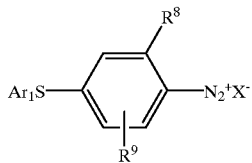
(8)

in which, in general formulae (6) and (7), $R^1$ and $R^2$ each represent one of a hydrogen atom and an alkyl group which may have a substituent; $R^1$ and $R^2$ may link with each other to form a heterocycle; $R^1$ and $R^2$ cannot both be hydrogen atoms; $R^3$ represents one of an alkyl group which may have a substituent, an alkoxy group which may have a substituent, an aryloxy group which may have a substituent, an alkylthio group which may have a substituent, an arylthio group which may have a substituent, an alkylsulfonyl group which may have a substituent, and an arylsulfonyl group which may have a substituent; $R^4$ represents one of a hydrogen atom, an alkyl group which may have a substituent, and an alkoxy group which may have a substituent; $R^5$ represents one of a hydrogen atom and an alkyl group which tray have a substituent; $R^6$ and $R^7$ each represent one of an alkyl group which may have a substituent, an alkoxy group which may have a substituent, an aryloxy group which may have a substituent, an alkylthio group which may have a substituent, and an arylthio group which may have a substituent; $R^6$ and $R^7$ may be the same or different from each other; and $X^-$ represents an acid anion, and in the general formula (8), $Ar^1$ represents an aryl group which may have a substituent; $R^8$ and $R^9$ each represent one of an alkyl group which may have a substituent, an aryl group which may have a substituent, an alkoxy group which may have a substituent, and an aryloxy group which may have a substituent; $R^8$ and $R^9$ may be the same or different from each other; and $X^-$ represents an acid anion.

7. The method for forming an azo colorant according to claim 1, wherein a reducing agent is utilized.

8. The method for forming an azo colorant according to claim 1, wherein a base is utilized.

9. The method for forming an azo colorant according to claim 3, wherein, in the general formulae (1), (2), (3), (4), and (5), L is one of a halogen atom, an alkylthio group which may have a substituent, an arylthio group which may have a substituent, and alkyl group which may have a substituent, an alkoxy group which may have a substituent, an aryloxy group which may have a substituent, an arylsulfonyloxy group which may have a substituent, an acyloxy group which may have a substituent, a benzolyloxy group which may have a substituent, a dialkylaminocarbonyloxy group which may have a substituent, a diarylaminocarbonyloxy group which may have a substituent, an alkoxycarbonyloxy group which may have a substituent, an aryloxycarbonyloxy group which may have a substituent, an N-pyrazolyl group which may have a substituent, an N-imidazoyl group which may have a substituent, and an N-benzotriazolyl group which may have a substituent.

10. The method for forming an azo colorant according to claim 2, wherein a reducing agent is utilized.

11. The method for forming an azo colorant according to claim 2, wherein a base is utilized.

12. The method for forming an azo colorant according to claim 5, wherein, in the general formulae (1), (2), (3), (4), and (5), L is one of a halogen atom, an alkylthio group which may have a substituent, an arylthio group which may have a substituent, an alkyl group which may have a substituent, an alkoxy group which may have a substituent, an aryloxy group which may have a substituent, and arylsulfonyloxy group which may have a substituent, and acyloxy group which may have a substituent, a benzoyloxy group which may have a substituent, a dialkylaminocarbonyloxy group which may have a substituent, a diarylaminocarbonyloxy group which may have a substituent, an alkoxycarbonyloxy group which may have a substituent, an aryloxycarbonyloxy group which may have a substituent, an N-pyrazolyl group which may have a substituent, an N-imidazoyl group which may have a substituent, and an N-benzotnazolyl group.

13. A recording material comprising a support and at least one recording layer disposed thereon containing a diazo compound and a coupler which reacts with the diazo compound for developing color, wherein the coupler has a leaving group at a coupling position thereof, and wherein the coupler is not a naphthol.

14. A recording material comprising a support and at least one recording layer disposed thereon containing a diazo compound and a coupler which reacts with the diazo compound for developing color, wherein the coupler has a leaving group at a coupling position thereof, the diazo compound and the coupler have a faster coupling reaction rate constant therebetween, measured by mixing equivalent amounts of an ethyl acetate solution containing an $8\times10^{-5}$ mole concentration of the diazo compound and an ethyl acetate solution containing an $8\times10^{-3}$ mole concentration of the coupler and a base with a stopped flow measurement device and by measuring change over time of an absorbance of the produced colorant and applying the resultant value to the following formula (1), than in a case of a coupler having a hydrogen atom at a coupling position thereof, and the coupling reaction rate constant k therebetween is at least 0.1 $s^{-1}$:

$$D\{colorant\}/dt = k\{diazo\ compound\} \qquad \text{formula (1)}$$

wherein k denotes the coupling reaction rate constant ($s^{-1}$), t denotes time (s), {colorant} denotes a mole amount of the produced colorant, and {diazo compound} denotes an initial mole amount of the diazo compound (mol).

15. The recording material according to claim 13, wherein the coupler has a structure represented by one of the following general formulae (1), (2), (3), (4), and (5):

(1)

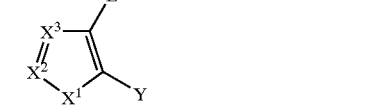
(2)

(3)

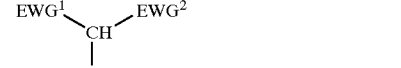
(4)

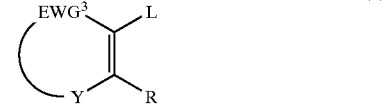
(5)

in which $X^1$, $X^2$, $X^3$, and $X^4$ each independently represent an atomic group necessary for forming a five-membered aromatic heterocyclic ring; Y represents one of a hydroxyl group, an amino group which may have a substituent, an alkyl group which may have a substituent, an aryl group which may have a substituent, an alkoxy group which may have a substituent, and an aryloxy group which may have a substituent; R represents one of a hydroxyl group, an alkyl group which may have a substituent, an aryl group which may have a substituent, an alkoxy group which may have a substituent, an aryloxy group which may have a substituent, an amino group which may have a substituent, an alkylthio group which may have a substituent, and an arylthio group which may have a substituent; Z represents one of a hydroxyl group and an amino group which may have a substituent; Ar represents a benzene ring, a naphthalene ring, a pyridine ring or a quinoline ring, each of which may have a substituent; L represents a substituent that is releasable at a time of coupling with the diazo compound; $EWG^1$, $EWG^2$ and $EWG^3$ each independently represent an electron-attractive group; and $X^1$ and Y, $EWG^1$ and $EWG^2$, and Y and R may each link with each other to form a ring.

16. A recording material, comprising a support and at least one recording layer disposed thereon containing a diazo compound and a counter which reacts with the diazo compound for developing color, wherein the coupler has a leaving group at a coupling position thereof:

wherein the coupler has a structure represented by one of the following general formulae (1), (2), (3), (4), and (5):

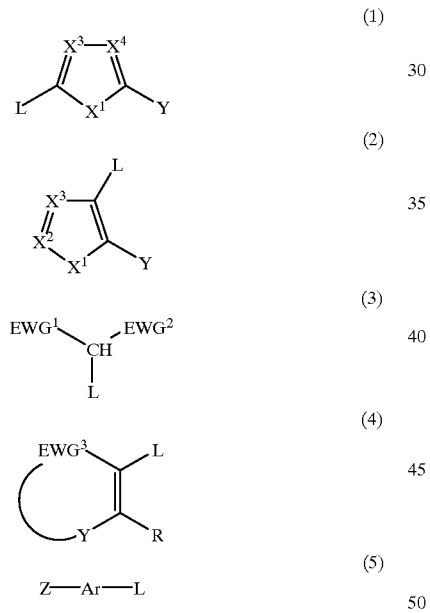

in which $X^1$, $X^2$, $X^3$, and $X^4$ each independently represent an atomic group necessary for forming a five-membered aromatic heteroring; Y represents one of a hydroxyl group, an amino group which may have a substituent, an alkyl group which may have a substituent, an aryl group which may have a substituent, an alkoxy group which may have a substituent, and an aryloxy group which may have a substituent; R represents one of a hydroxyl group, an alkyl group which may have a substituent, an aryl group which may have a substituent, an alkoxy group which may have a substituent, an aryloxy group which may have a substituent, an amino group which may have a substituent, an alkylthio group which may have a substituent, and an arylthio group which may have a substituent; Z represents one of a hydroxyl group and an amino group which may have a substituent; Ar represents a benzene ring, a naphthalene ring, a pyridine ring or a quinoline ring, each of which may have a substituent; L represents a substituent that is releasable at a time of coupling with the diazo compound: $EWG^1$, $EWG^2$ and $EWG^3$ each independently represent an electron-attractive group: and $X^1$ and Y, $EWG^1$ and $EWG^2$, and Y and R may each link with each other to form a ring; and wherein the diazo compound is a compound represented by one of the following general formulae (6), (7), and (8):

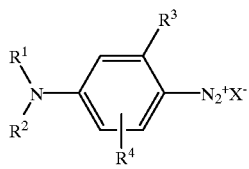

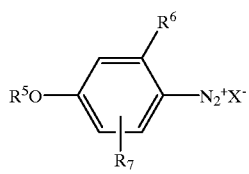

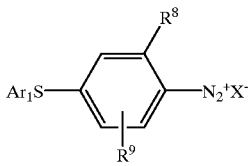

in which, in general formulae (6) and (7), $R^1$ and $R^2$ each represent one of a hydrogen atom and an alkyl group which may have a substituent; $R^1$ and $R^2$ may link with each other to form a heterocycle; $R^1$ and $R^2$ cannot both be hydrogen atoms; $R^3$ represents one of an alkyl group which may have a substituent, an alkoxy group which may have a substituent, an aryloxy group which may have a substituent, an alkylthio group which may have a substituent, an arylthio group which may have a substituent, an alkylsulfonyl group which may have a substituent, and an arylsulfonyl group which may have a substituent; $R^4$ represents one of a hydrogen atom, an alkyl group which may have a substituent, and an alkoxy group which may have a substituent; $R^5$ represents one of a hydrogen atom and an alkyl group which may have a substituent; $R^6$ and $R^7$ each represent one of an alkyl group which may have a substituent, an alkoxy group which may have a substituent, an aryloxy group which may have a substituent, an alkylthio group which may have a substituent, and an arylthio group which may have a substituent; $R^6$ and $R^7$ may be the same or different from each other; and $X^-$ represents an acid anion, and in the general formula (8), $Ar^1$ represents an aryl group which may have a substituent; $R^8$ and $R^9$ each represent one of an alkyl group which may have a substituent, an aryl group which may have a substituent, an alkoxy group which may have a substituent, and an aryloxy group which may have a substituent; $R^8$ and $R^9$ may be the same or different from each other; and $X^1$ represents an acid anion.

17. The recording material according to claim 13, wherein the diazo compound is contained in a microcapsule.

18. The recording material according to claim 14, wherein the coupler has a structure represented by one of the following general formulae (1), (2), (3), (4), and (5):

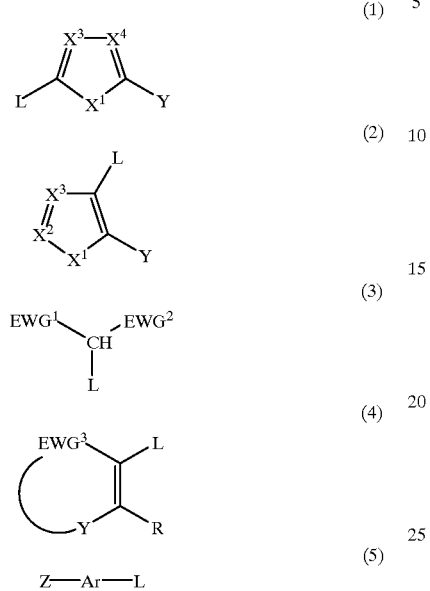

in which $X^1$, $X^2$, $X^3$, and $X^4$ each independently represent an atomic group necessary for forming a five-membered aromatic heteroring; Y represents one of a hydroxyl group, an amino group which may have a substituent, an alkyl group which may have a substituent, an aryl group which may have a substituent, an alkoxy group which may have a substituent, and an aryloxy group which may have a substituent; R represents one of a hydroxyl group, an alkyl group which may have a substituent, an aryl group which may have a substituent, an alkoxy group which may have a substituent, an aryloxy group which may have a substituent, an amino group which may have a substituent, an alkylthio group which may have a substituent, and an arylthio group which may have a substituent; Z represents one of a hydroxyl group and an amino group which may have a substituent; Ar represents a benzene ring, a naphthalene ring, a pyridine ring or a quinoline ring, each of which may have a substituent; L represents a substituent that is releasable at a time of coupling with the diazo compound; $EWG^1$, $EWG^2$ and $EWG^3$ each independently represent an electron-attractive group; and $X^1$ and Y, $EWG^1$ and $EWG^2$, and Y and R may each link with each other to form a ring.

19. The recording material according to claim 18, wherein the diazo compound is a compound represented by one of the following general formulae (6), (7), and (8):

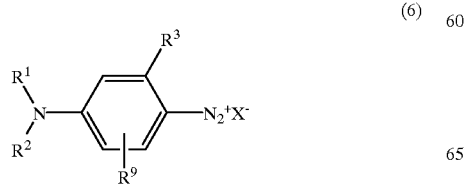

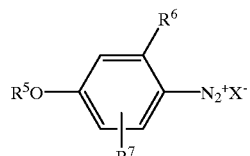

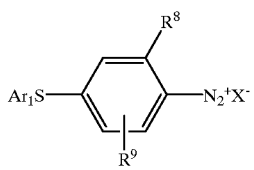

in which, in general formulae (6) and (7), $R^1$ and $R^2$ each represent one of a hydrogen atom and an alkyl group which may have a substituent; $R^1$ and $R^2$ may link with each other to form a heterocycle; $R^1$ and $R^2$ cannot both be hydrogen atoms; $R^3$ represents one of an alkyl group which may have a substituent, an alkoxy group which may have a substituent, an aryloxy group which may have a substituent, an alkylthio group which may have a substituent, an arylthio group which may have a substituent, an alkylsulfonyl group which may have a substituent, and an arylsulfonyl group which may have a substituent; $R^4$ represents one of a hydrogen atom, an alkyl group which may have a substituent, and an alkoxy group which may have a substituent; $R^5$ represents one of a hydrogen atom and an alkyl group which may have a substituent; $R^6$ and $R^7$ each represent one of an alkyl group which may have a substituent, an alkoxy group which may have a substituent, an aryloxy group which may have a substituent, an alkylthio group which may have a substituent, and an arylthio group which may have a substituent; $R^6$ and $R^7$ may be the same or different from each other; and $X^-$ represents an acid anion, and in the general formula (8), $Ar^1$ represents an aryl group which may have a substituent; $R^8$ and $R^9$ each represent one of an alkyl group which may have a substituent, an aryl group which may have a substituent, an alkoxy group which may have a substituent, and an aryloxy group which may have a substituent; $R^8$ and $R^9$ may be the same or different from each other; and $X^-$ represents an acid anion.

20. The recording material according to claim 14, wherein the diazo compound is contained in a microcapsule.

21. A method for forming an azo colorant, wherein a coupler having a structure represented by one of the following general formulae (1), (2), (3), (4), and (5), and a diazo compound are used:

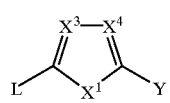

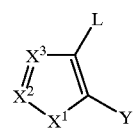

-continued

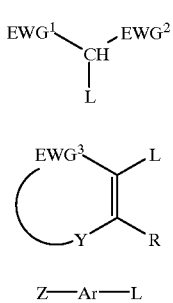

(3)

(4)

(5)

in which $X^1$, $X^2$, $X^3$, and $X^4$ each independently represent an atomic group necessary for forming a five-membered aromatic heteroring; Y represents one of a hydroxyl group, an amino group which may have a substituent, an alkyl group which may have a substituent, an aryl group which may have a substituent, an alkoxy group which may have a substituent, and an aryloxy group which may have a substituent; R represents one of a hydroxyl group, an alkyl group which may have a substituent, an aryl group which may have a substituent, an alkoxy group which may have a substituent, an aryloxy group which may have a substituent, an amino group which may have a substituent, an alkylthio group which may have a substituent, and an arylthio group which may have a substituent; Z represents one of a hydroxyl group and an amino group which may have a substituent; Ar represents a benzene ring, a naphthalene ring, a pyridine ring or a quinoline ring, each of which may have a substituent; L represents a substituent that is releasable at a time of coupling with the diazo compound; $EWG^1$, $EWG^2$ and $EWG^3$ each independently represent an electron-attractive group; and $X^1$ and Y, $EWG^1$ and $EWG^2$, and Y and R may each link with each other to form a ring; and wherein the coupler is not a naphthol.

22. A method for forming an azo colorant, wherein a coupler having a structure represented by one of the following general formulae (1), (2), (3), (4), and (5), and a diazo compound are used:

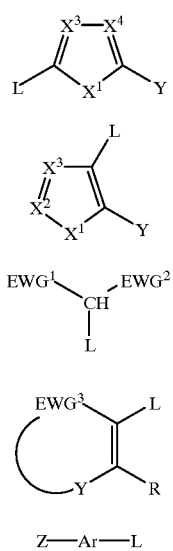

(1)

(2)

(3)

(4)

(5)

in which $X^1$, $X^2$, $X^3$, and $X^1$ each independently represent an atomic group necessary for forming a five-membered aromatic heteroring; Y represents one of a hydroxyl group, an amino group which may have a substituent, an alkyl group which may have a substituent, an aryl group which may have a substituent, an alkoxy group which may have a substituent, and an aryloxy group which may have a substituent: R represents one of a hydroxyl group, an alkyl group which may have a substituent, an aryl group which may have a substituent, an alkoxy group which may have a substituent, an aryloxy group which may have a substituent, an amino group which may have a substituent, an alkylthio group which may have a substituent, and an arylthio group which may have a substituent; Z represents one of a hydroxyl group and an amino group which may have a substituent; Ar represents a benzene ring, a naphthalene ring, a pyridine ring or a quinoline ring, each of which may have a substituent; L represents a substituent that is releasable at a time of coupling with the diazo compound; $EWG^1$, $EWG^2$ and $EWG^3$ each independently represent an electron-attractive group; and $X^1$ and Y, $EWG^1$ and $EWG^2$, and Y and R may each link with each other to form a ring; and wherein the diazo compound is a compound represented by one of the following general formulae (6), (7), and (8):

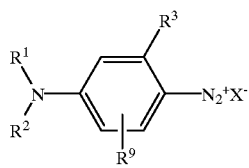

(6)

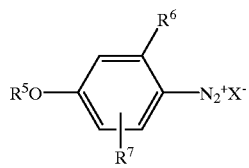

(7)

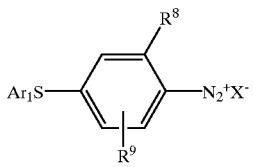

(8)

in which, in general formulae (6) and (7), $R^1$ and $R^2$ each represents one of a hydrogen atom and an alkyl group which may have a substituent; $R^1$ and $R^2$ may link with each other to form a heterocycle; $R^1$ and $R^2$ cannot both be hydrogen atoms; $R^3$ represents one of an alkyl group which may have a substituent, an alkoxy group which may have a substituent, an aryloxy group which may have a substituent, an alkylthio group which may have a substituent, an arylthio group which may have a substituent, an alkylsulfonyl group which may have a substituent, and an arylsulfonyl group which may have a substituent; $R^4$ represents one of a hydrogen atom, an alkyl group which may have a substituent, and an alkoxy group which may have a substituent; $R^5$ represents one of a hydrogen atom and an alkyl group which may have a substituent; $R^6$ and $R^7$ each represents one of an alkyl group which may have a substituent, an alkoxy group which may have a substituent, an aryloxy group which may have a substituent, an alkylthio group which may have a substituent, and an arylthio group which may have a substituent; $R^6$ and $R^7$ may be the same or different from each other; and $X^-$ represents an acid anion, and in the general formula (8), Ar¹ represents an aryl group which may have a substituent; R⁸ and R⁹ each represent one of an alkyl group which may have a substituent, an aryl group which may have a substituent, an alkoxy group which may have a substituent, and an aryloxy group which may have a substituent; R⁸ and R⁹ may be the same or different from each other; and X⁻ represents an acid anion.

23. The method for forming an azo colorant according to claim 21, wherein a reducing agent is utilized.

24. The method for forming an azo colorant according to claim 21, wherein a base is utilized.

25. The method for forming an azo colorant according to claim 21, wherein, in the general formulae (1), (2), (3), (4), and (5), L is one of a halogen atom, an alkylthio group which may have a substituent, an arylthio group which may have a substituent, an alkyl group which may have a substituent, an alkoxy group which may have a substituent, an aryloxy group which may have a substituent, an arylsulfonyloxy group which may have a substituent, an acyloxy group which may have a substituent, a benzoyloxy group which may have a substituent, a dialkylaminocarbonyloxy group which may have a substituent, a diarylaminocarbonyloxy group which may have a substituent, an alkoxycarbonyloxy group which may have a substituent, an aryloxycarbonyloxy group which may have a substituent, an N-pyrazolyl group which may have a substituent, an N-imidazoyl group which may have a substituent, and an N-benzotriazolyl group which may have a substituent.

26. The method for forming an azo colorant according to claim 22, wherein a reducing agent is utilized.

27. The method for forming an azo colorant according to claim 22, wherein a base is utilized.

28. The method for forming an azo colorant according to claim 22, wherein, in the general formulae (1), (2), (3), (4), and (5), L is one of a halogen atom, an alkylthio group which may have a substituent, an arylthio group which may have a substituent, an alkyl group which may have a substituent, an alkoxy group which may have a substituent, an aryloxy group which may have a substituent, an arylsulfonyloxy group which may have a substituent, an acyloxy group which may have a substituent, a benzoyloxy group which may have a substituent, a dialkylaminocarbonyloxy group which may have a substituent, a diarylaminocarbonyloxy group which may have a substituent, an alkoxycarbonyloxy group which may have a substituent, an aryloxycarbonyloxy group which may have a substituent, an N-pyrazolyl group which may have a substituent, an N-imidazoyl group which may have a substituent, and an N-benzotriazolyl group which may have a substituent.

29. A recording material comprising a support and at least one recording layer disposed thereon containing a diazo compound and a coupler which reacts with the diazo compound for developing color, wherein the coupler has a structure represented by one of the following general formulae (1), (2), (3), (4), and (5):

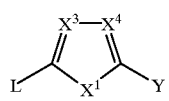

(1)

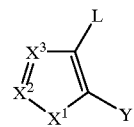

(2)

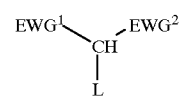

(3)

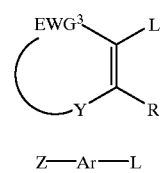

(4)

Z—Ar—L (5)

in which $X^1$, $X^2$, $X^3$, and $X^4$ each independently represent an atomic group necessary for forming a five-membered aromatic heteroring; Y represents one of a hydroxyl group, an amino group which may have a substituent, an alkyl group which may have a substituent, an aryl group which may have a substituent, an alkoxy group which may have a substituent, and an aryloxy group which may have a substituent; R represents one of a hydroxyl group, an alkyl group which may have a substituent, an aryl group which may have a substituent, an alkoxy group which may have a substituent, an aryloxy group which may have a substituent, an amino group which may have a substituent, an alkylthio group which may have a substituent, and an arylthio group which may have a substituent; Z represents one of a hydroxyl group and an amino group which may have a substituent; Ar represents a benzene ring, a naphthalene ring, a pyridine ring or a quinoline ring, each of which may have a substituent; L represents a substituent that is releasable at a time of coupling with the diazo compound; $EWG^1$, $EWG^2$ and $EWG^3$ each independently represent an electron-attractive group; and $X^1$ and Y, $EWG^1$ and $EWG^2$, and Y and R may each link with each other to form a ring; and wherein the coupler is not a naphthol.

30. The recording material according to claim 29, wherein the diazo compound is a compound represented by one of the following general formulae (6), (7), and (8):

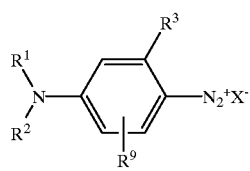

(6)

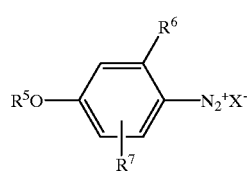

(7)

-continued (8)

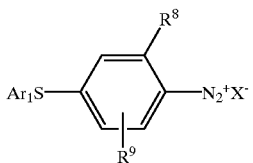

in which, in general formulae (6) and (7), $R^1$ and $R^2$ each represent one of a hydrogen atom and an alkyl group which may have a substituent; $R^1$ and $R^2$ may link with each other to form a heterocycle; $R^1$ and $R^2$ cannot both be hydrogen atoms; $R^3$ represents one of an alkyl group which may have a substituent, an alkoxy group which may have a substituent, an aryloxy group which may have a substituent, an alkylthio group which may have a substituent, an arylthio group which may have a substituent, an alkylsulfonyl group which may have a substituent, and an arylsulfonyl group which may have a substituent; $R^4$ represents one of a hydrogen atom, an alkyl group which may have a substituent, and an alkoxy group which may have a substituent; $R^5$ represents one of a hydrogen atom and an alkyl group which may have a substituent; $R^6$ and $R^7$ each represent one of an alkyl group which may have a substituent, an alkoxy group which may have a substituent, an aryloxy group which may have a substituent, an alkylthio group which may have a substituent, and an arylthio group which may have a substituent; $R^6$ and $R^7$ may be the same or different from each other; and $X^-$ represents an acid anion, and in the general formula (8), $Ar^1$ represents an aryl group which may have a substituent; $R^8$ and $R^9$ each represent one of an alkyl group which may have a substituent, an aryl group which may have a substituent, an alkoxy group which may have a substituent, and an aryloxy group which may have a substituent; $R^8$ and $R^9$ may be the same or different from each other; and $X^-$ represents an acid anion.

31. The recording material according claim 29, wherein the diazo compound is contained in a microcapsule.

32. The recording material according claim 30, wherein the diazo compound is contained in a microcapsule.

* * * * *

UNITED STATES PATENT AND TRADEMARK OFFICE
CERTIFICATE OF CORRECTION

PATENT NO. : 6,864,032 B2
DATED : March 8, 2005
INVENTOR(S) : Hisao Yamada, Mitsuyuki Tsurumi and Kazunori Nigorikawa It is certified that error appears in the above-identified patent and that said Letters Patent is hereby corrected as shown below:

Column 69,
Line 37, should read -- and a diazo compound are used, and the method has --
Line 51, should read -- wherein k denotes the coupling reaction rate constant ($s^{-1}$), t --

Column 73,
Line 23, should read -- one of a hydrogen atom and an alkyl group which may have --

Signed and Sealed this

Nineteenth Day of July, 2005

JON W. DUDAS
*Director of the United States Patent and Trademark Office*